United States Patent
Sugimoto et al.

(10) Patent No.: US 6,274,971 B1
(45) Date of Patent: Aug. 14, 2001

(54) SPARK PLUG AND METHOD OF MANUFACTURING THE SAME

(75) Inventors: Makoto Sugimoto, Nagoya; Hiroaki Masuda, Nisshin, both of (JP)

(73) Assignee: NGK Spark Plug Co., Ltd. (JP)

( * ) Notice: Subject to any disclaimer, the term of this patent is extended or adjusted under 35 U.S.C. 154(b) by 0 days.

(21) Appl. No.: 09/314,031

(22) Filed: May 18, 1999

(30) Foreign Application Priority Data

May 22, 1998 (JP) .................................... 10-140779
Mar. 19, 1999 (JP) .................................... 11-076409

(51) Int. Cl.$^7$ .................................................. H01T 13/20
(52) U.S. Cl. ............................................................ 313/143
(58) Field of Search .................................... 313/143, 137, 313/118

(56) References Cited

U.S. PATENT DOCUMENTS

| | | | |
|---|---|---|---|
| 4,084,976 | 4/1978 | Hinton | 106/48 |
| 4,120,733 | 10/1978 | Knapp | 106/48 |
| 4,256,497 | 3/1981 | Knapp | 106/48 |
| 4,746,578 | 5/1988 | Kondo et al. | 428/432 |
| 4,937,484 * | 6/1990 | Ishino | 313/143 |
| 5,518,968 | 5/1996 | Knapp | 501/14 |
| 5,677,250 | 10/1997 | Knapp | 501/14 |
| 5,859,491 | 1/1999 | Nishikawa et al. | 313/141 |

FOREIGN PATENT DOCUMENTS

| | | |
|---|---|---|
| 0 788 204 A1 | 8/1997 | (EP) . |
| 56-54253 | 5/1981 | (JP) . |
| 56-106305 | 8/1981 | (JP) . |
| 56-107590 | 8/1981 | (JP) . |

* cited by examiner

*Primary Examiner*—Ashok Patel
(74) *Attorney, Agent, or Firm*—Brinks Hofer Gilson & Lione

(57) ABSTRACT

A glaze layer formed on the surface an alumina-based insulator of a resistor spark plug contains $SiO_2$ (18 to 35% by weight), $B_2O_3$ (25 to 40% by weight), ZnO (10 to 25% by weight), BaO (7 to 20% by weight), $Na_2O$ (3 to 9% by weight), and $K_2O$ (3 to 9% by weight). Since the difference between the coefficients of linear expansion of the glaze and that of the alumina-based insulating material is relatively small, the glaze layer is less susceptible to cracks and the like. Also, since the glaze has a softening point lower than that of conventional lead-silicate-glass-based glaze, the glost-firing temperature can be as low as 800° to 950° C. Therefore, even in the case where glost firing is performed concurrently with a glass sealing step, a center electrode and a terminal metal piece are less susceptible to oxidation. Further, even though the content of the alkali metal component is high, a good insulating performance is obtained so that excellent flashover resistance is attained.

30 Claims, 12 Drawing Sheets

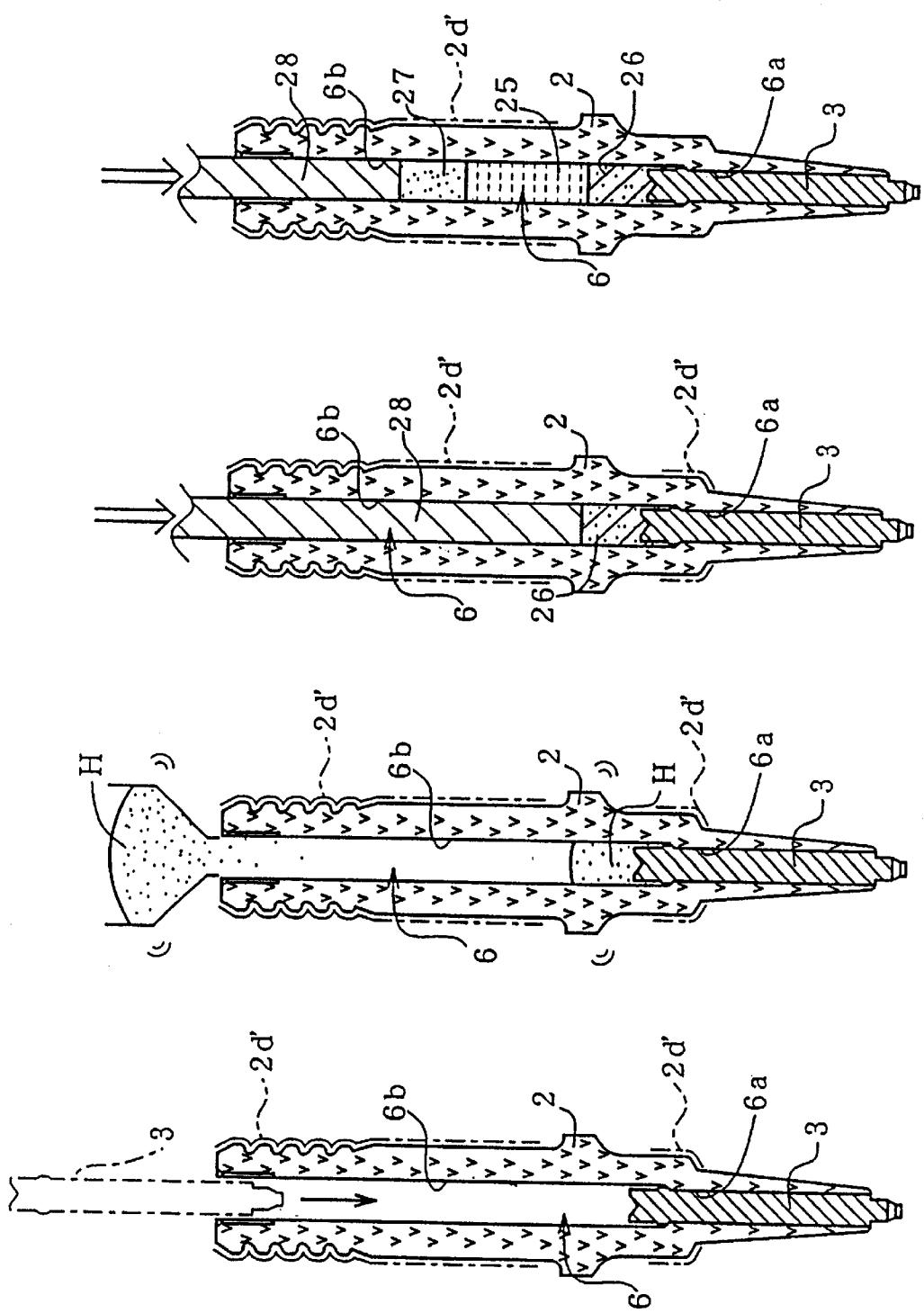

SPARK PLUG AND METHOD OF MANUFACTURING THE SAME

BACKGROUND OF THE INVENTION

1. Field of the Invention

The present invention relates to a spark plug and to a method of manufacturing the spark plug.

2. Description of Related Art

A spark plug used for providing ignition in an internal combustion engine such as an automobile engine typically includes a metallic shell; an insulator formed from, for example, an alumina-based ceramic and disposed within the metallic shell; and a center electrode disposed within the insulator. A ground electrode is attached to the metallic shell. The insulator axially projects from the rear opening portion of the metallic shell. A terminal metal piece is disposed inside the projecting portion of the insulator. The terminal metal piece is connected to the center electrode via a resistor, conductive glass seal layers formed in a glass sealing step and the like. Upon application of a high voltage via the terminal metal piece, spark discharge is induced at a gap formed between the ground electrode and the center electrode.

However, if the spark plug is subjected to certain conditions simultaneously, such as high plug temperature, high ambient humidity, and the like, application of high voltage cannot successfully induce spark discharge at the gap, and there may occur a so-called "flashover" phenomenon in which spark discharge is induced between the terminal metal piece and the metallic shell such that the spark runs over the surface of the projecting portion of the insulator. Therefore, in order to prevent the flashover phenomenon, most spark plugs for general use have a glaze layer formed on the surface of their insulators. The glaze layer also serves for smoothing the surface of the insulator so as to prevent contamination, and for increasing chemical or mechanical strength.

The glaze layer is formed on an insulator, through application of glaze slurry onto the surface of an insulator and firing (particularly called "glost firing"). In the case of an alumina-based insulator for use in a spark plug, a glaze layer is formed on a fired insulator through subsequent baking at 1000° to 1100° C. In such a case, there has conventionally been used lead-silicate-glass-based glaze which has a lowered softening point due to incorporation of a relatively large amount of PbO to silicate glass. However, this type of glaze involves the following drawbacks:

(1) Since the glaze has a coefficient of linear expansion lower than that of alumina-based insulating material which serves as a substrate, the obtained glaze layer is susceptible to cracks and the like.

(2) Although the glaze contains a considerable amount of PbO, the glost-firing temperature is still high; i.e., 1000° C. or more. In the manufacture of spark plugs, glost firing is often performed concurrently with a glass sealing step so as to reduce the number of manufacturing steps. Therefore, high glost-firing temperature as described above disadvantageously permits accelerated oxidation of a terminal metal piece and a center electrode. A conceivable measure for further lowering the glost-firing temperature is to add alkali metal oxide such as $Na_2O$ to the glaze. However, if the amount of alkali metal components is increased excessively, insulation performance is lowered, and the spark plug becomes susceptible to flashover.

(3) In recent years, concerns for environmental protection have increased worldwide, and glaze containing Pb has been used less often. For example, the automobile industry, which uses a large number of spark plugs, is considering the complete abolition of spark plugs using glaze containing Pb, in view of the environmental effect of discarded spark plugs.

SUMMARY OF THE INVENTION

According to a first mode of the present invention, there is provided a spark plug comprising a center electrode, a metallic shell, a ground electrode, an insulator, and a glaze layer. The metallic shell is disposed so as to surround the center electrode. One end of the ground electrode is connected to the metallic shell, while the other end of the ground electrode faces the center electrode. The insulator is disposed between the center electrode and the metallic shell such that the insulator covers the outer surface of the center electrode. The glaze layer is formed so as to cover at least a portion of the surface of the insulator. In order to achieve the above-described objects, glaze which forms the glaze layer predominantly comprises, as elements before undergoing oxidization, Si, B, Zn, and Ba, and two elements selected from among Na, K, and Li (hereinafter these two elements are called "co-added alkali metal components"). Specifically, the glaze contains Si in an amount of 18 to 35% by weight as reduced to $SiO_2$, B in an amount of 25 to 40% by weight as reduced to $B_2O_3$, Zn in an amount of 10 to 25% by weight as reduced to ZnO, and Ba in an amount of 7 to 20% by weight as reduced to BaO. Also, each of the two co-added alkali metal components is contained in the glaze in an amount of 3 to 9% by weight, as reduced to $Na_2O$, $K_2O$, or $Li_2O$.

When the insulator to be coated with the glaze is formed of, for example, alumina-based insulating material, the difference between the coefficient of linear expansion of the insulator and that of the glaze of the above-described composition used for the spark plug of the first mode is relatively small, so that the glaze layer is less susceptible to cracks and the like. Also, since the amount of the alkali metal components is set relatively high, the glaze has a softening point lower than that of conventional lead-silicate-glass-based glaze. Consequently, the glost-firing temperature can be as low as 800° to 950° C. Therefore, even in the case where glost firing is performed concurrently with the glass sealing step as mentioned above, the center electrode and the below-described terminal metal piece are less susceptible to oxidation.

Further, notwithstanding the high amount of the alkali metal components, excellent insulation performance can be obtained. In this regard, it is important that two different alkali metal components selected from among Na, K, and Li be added concurrently, rather than just one type of alkali metal component being added. That is, the present inventors conducted studies and found the following: In the case where an alkali metal component is added alone, as the amount thereof increases, the conductivity of glaze drastically increases, leading to considerable impairment of insulation performance. However, when two types of alkali metal components are added in combination, conductivity of glaze does not increase greatly, even when the total amount of the added components is considerably increased, so that excellent insulation performance is secured. As a result, the amount of alkali metal components can be increased while permitting minimal reduction in insulation performance, leading to simultaneous attainment of the two goals, i.e., flashover prevention and lowering of glost-firing temperature. Also, the remaining third alkali metal component and other alkali metal components may be added, so long as the conductivity suppression effect of the co-added alkali metal components is not impaired.

The amount of Si contained in the glaze is set within the range of 18 to 35% by weight as reduced to an oxidized form, $SiO_2$. When the insulator to be coated with the glaze is formed of alumina-based insulating material, if the Si content is less than 18% by weight, the coefficient of linear expansion of the glaze becomes excessively high, so that the glaze layer becomes more susceptible to defects such as cracks. By contrast, if the Si content is in excess of 35% by weight, the coefficient of linear expansion of the glaze becomes too low, so that the glaze layer becomes more susceptible to defects such as crazing. Preferably, the Si content is set within the range of 25 to 30% by weight.

The B content is set within the range of 25 to 40% by weight as reduced to $B_2O_3$. If the B content is less than 25% by weight, the softening point of the glaze increases, which can lead to failure to attain glost firing at the prescribed desired temperature (800° to 950° C. as described above). By contrast, when the B content is higher than 40% by weight, phase separation tends to occur in the resultant glaze layer, which may result in devitrification, deteriorated insulation performance, or incompatibility with the substrate in terms of the coefficient of linear expansion. Preferably, the B content is set within the range of 30 to 35% by weight.

The Zn content is set within the range of 10 to 25% by weight as reduced to ZnO. If the Zn content is less than 10% by weight, the softening point of the glaze increases, which can lead to failure to attain glost firing at the prescribed desired temperature. By contrast, if the Zn content is in excess of 25% by weight, the coefficient of linear expansion of the glaze becomes excessively high, so that the glaze layer becomes more susceptible to defects such as cracks. Preferably, the Zn content is set within the range of 12 to 18% by weight.

The Ba content is set within the range of 7 to 20% by weight as reduced to BaO. If the Ba content is less than 7% by weight, the insulation performance of the glaze is lowered, which can lead to impaired flashover prevention. By contrast, if the Ba content is in excess of 20% by weight, the softening point of the glaze increases, which can lead to failure to attain glost firing at the prescribed desired temperature. Preferably, the Ba content is set within the range of 8 to 15% by weight.

The two co-added alkali metal components are each contained in the glaze in an amount of 3 to 9% by weight. In this case, Na is calculated as reduced to $Na_2O$, K is calculated as reduced to $K_2O$, and Li is calculated as reduced to $Li_2O$. If the amount of at least one component is less than 3% by weight, the softening point of the glaze increases, which can lead to failure to attain glost firing at the prescribed desired temperature. Also, if the amount of at least one component is in excess of 9% by weight, the coefficient of linear expansion of the glaze excessively is increased, so that the glaze layer becomes susceptible to defects such as cracks.

Also, the total amount of the co-added alkali metal components contained in the glaze is preferably regulated within the range of 6 to 14% by weight as reduced to the respective oxides. If the total amount of the co-additional alkali metal components is less than 6% by weight, the softening point of the glaze increases, which can lead to failure to attain glost firing at the prescribed desired temperature. By contrast, if the total amount is in excess of 14% by weight, the insulation performance of the glaze is lowered, which can lead to impaired flashover prevention.

Further, the value of A1/A2 is preferably regulated within the range of 1.0 to 2.0, wherein A1 represents the amount by mole of one of the two co-added alkali metal components and A2 represents that of the other, provided that Na is calculated as reduced to $Na_2O$, K is calculated as reduced to $K_2O$, and Li is calculated as reduced to $Li_2O$. If the value of A1/A2 is above or below the mentioned range, the conductivity suppression effect of the co-addition of the alkali metal components is not sufficiently attained. As a result, insulation performance of the glaze is lowered, which can lead to impaired flashover prevention. Preferably, the value of A1/A2 is regulated within the range of 1.5 to 2.0.

In order to suppress the increase in conductivity of the glaze with the amount of the alkali metal components, Na and K are preferably used as the co-added alkali metal components. In this case, Na is preferably added in an amount of 3 to 9% by weight as reduced to $Na_2O$, and K is preferably added in an amount of 3 to 9% by weight as reduced to $K_2O$.

The total amount of cationic components contained in the glaze; i.e., Si, B, Zn, Ba, and co-added alkali metal components, is preferably at least 95% by weight as reduced to their oxides. When the total amount is less than 95% by weight, the softening point of the glaze increases, which can lead to failure to attain glost firing at the prescribed desired temperature. Preferably, the total amount is 97% by weight or more.

Further, the glaze may contain, as auxiliary cationic components, one or more elements selected from among Al, Ca, Fe, Zr, Ti, Sr, Mg, Bi, Ni, Sn, P, and Mn. The total amount of the auxiliary cationic components is 5% by weight or less with respect to the entirety of the glaze composition. In this case, Al is calculated as reduced to $Al_2O_3$, Ca is calculated as reduced to CaO, Fe is calculated as reduced to $Fe_2O_3$, Zr is calculated as reduced to $ZrO_2$, Ti is calculated as reduced to $TiO_2$, Sr is calculated as reduced to SrO, Mg is calculated as reduced to MgO, Bi is calculated as reduced to $Bi_2O_3$, Ni is calculated as reduced to NiO, Sn is calculated as reduced to $SnO_2$, P is calculated as reduced to $P_2O_5$, and Mn is calculated as reduced to MnO. These components may be intentionally added for a variety of purposes. In some cases, they may be spontaneously present in the glaze as impurities (contaminants) derived from raw materials (or the below-described clay minerals which are added during preparation of glaze slurry) or refractory material used in a melting step. Both Fe (II) ions (for example, FeO) and Fe (III) ions (for example, $Fe_2O_3$) can be used as Fe sources for material of the glaze. In the present invention, the amount of Fe contained in the resultant glaze layer is represented by the value as reduced to $Fe_2O_3$, irrespective of the valence numbers of Fe ions.

If the total amount of the auxiliary cationic components is in excess of 5% by weight, the total amount of the primary cationic components cannot be 95% by weight or more. Preferably, the total amount of the auxiliary cationic components is 3.0% by weight or less. In the following description, in some cases, the primary cationic components and the auxiliary cationic components are collectively referred to as simply "cationic components."

Devitrification of the glaze is suppressed through addition of Al in an amount of 5% by weight or less. Also, other components can be added as appropriate for regulating the softening point of the glaze. Addition of $Bi_2O_3$ is particularly effective for lowering the softening point of the glaze.

The glaze may contain substantially no Pb (except for the case in which Pb unavoidably migrates, for example, from raw materials of glaze). If the glaze contains Pb, the Pb content may be 1.0% by weight or less as reduced to PbO.

If Pb is contained in the glaze in the form of an ion having a low valence number (for example, $Pb^{2+}$), the ion is oxidized into an ion having a higher valence number (for example, $Pb^{3+}$) through corona discharge or a like phenomenon occurring on the surface of the glaze layer. As a result, the insulation performance of the glaze can be lowered, resulting in impaired flashover prevention. Recently, concern for environmental protection has been increasing, and usage of material containing no Pb has been investigated. From this viewpoint, the glaze used for the spark plug of the present invention is advantageous, since the glaze contains substantially no Pb as a cationic component. In other words, no problems arise in the glaze if the Pb content is lowered to a level at which the glaze contains substantially no Pb, other than Pb which is present in an amount up to about 1.0% by weight in the form of an inevitable impurity. The object of reducing the Pb content of glaze is thus achieved. Preferably, the Pb content is 0.1% by weight or less.

A spark plug according to a second mode of the present invention is identical with the above-described spark plug according to the first mode with regard to the main portions other than the glaze layer. The glaze which forms a glaze layer contains components serving as the primary cationic components (herein after called "primary cationic components"), i.e., Si, B, Zn, and Ba; at least one element selected from among Ti and Zr; at least one element selected from among Na, K, and Li as an alkali metal component; and Pb. The amounts of the primary cationic components are as follows: Si is contained in an amount of 20 to 40% by weight as reduced to $SiO_2$, B is contained in an amount of 20 to 35% by weight as reduced to $B_2O_3$, Zn is contained in an amount of 15 to 25% by weight as reduced to ZnO, and Ba is contained in an amount of 10 to 23% by weight as reduced to BaO. The total amount of Ti calculated as reduced to $TiO_2$ and Zr calculated as reduced to $ZrO_2$ is 2 to 10% by weight. The total amount of the alkali metal components is 12% by weight or less, wherein Na is calculated as reduced to $Na_2O$, K is calculated as reduced to $K_2O$, and Li is calculated as reduced to $Li_2O$. The amount of Pb is 0.1% by weight or less as reduced to PbO.

The second mode covers the following four aspects of the present invention. The four aspects may be applied singly or in an arbitrary combination.

First aspect: The Si content is 20 to 38% by weight as reduced to $SiO_2$ (the first aspect may be combined with at least one of a second aspect, a third aspect, and a fourth aspect).

Second aspect: The Zr content is 3.4% by weight or less as reduced to $ZrO_2$ (the second aspect may be combined with at least one of the first aspect, the third aspect, and the fourth aspect).

Third aspect: The Ti content is 1.5% by weight or more as reduced to $TiO_2$ (the third aspect may be combined with at least one of the first aspect, the second aspect, and the fourth aspect).

Fourth aspect: WTi/WZr is 0.2 to 10, wherein WZr represents Zr content as reduced to $ZrO_2$, and WTi represents Ti content as reduced to $TiO_2$ (the fourth aspect may be combined with at least one of the first aspect, the second aspect, and the third aspect).

Next, the action and effects of the second mode of the present invention will be described in detail, including the respective actions and effects of the above-described first, second, third, and fourth aspects. The glaze layer serving as the main portion of the spark plug of the second mode of the present invention is characterized by comprising Ti and Zr in a total amount of 2 to 10% by weight as reduced to the respective oxides, while the total amount of the alkali metal components is limited to 12% by weight or less (including 0% by weight), and the B content is limited to the range of 20 to 35% by weight as reduced to an oxide, $B_2O_3$. Limiting the total amount of the alkali metal components and the B content within the above-mentioned ranges enables easy formation of a glaze layer having uniform thickness and fewer defects such as bubbles.

The reason why the above-mentioned effect is obtained through reduction of the amount of the alkali metal components and the B content is conceivable as follows: In the below-described manufacturing method of the present invention, if the glaze powder has a great amount of the alkali metal components and a high B content, when the glaze powder is processed into glaze slurry, these components are eluted in the slurry solvent such as water, resulting in increased viscosity of the slurry. If the viscosity of the slurry is drastically increased (for example, over 1000 mPa·s), uniform glaze-powder-coated layers become difficult to obtain, and bubbles and the like are more likely to be suspended in the layers. However, through selection of the above-described ranges of the amount of the alkali metal components and the B content, glaze slurry having low viscosity and high fluidity can be easily prepared. As a result, a glaze layer having uniform thickness and fewer defects is easily obtained.

Reduction of the amount of the alkali metal components and the B content leads to an increase in the softening point; i.e., an increase in the glost-firing temperature of glaze. As described above, in order to suppress increase in the softening point, conventionally a large amount of PbO is added to glaze. By contrast, in the above-described second mode, instead of PbO, the oxides of Ti and Zr are added to glaze. As a result, the Pb content is reduced remarkably; specifically, to 0.1% by weight or less as reduced to PbO, while an increase in the softening point of the glaze is suppressed. Preferably, the glaze contains substantially no Pb, excepting the case in which Pb migrates, for example, from raw materials of the glaze.

If an insulator to be coated with the glaze is formed of alumina-based insulating material, the difference between the coefficient of linear expansion of the glaze and that of the insulator is relatively small, so that the glaze layer becomes less susceptible to cracks and the like. Also, since the glaze has a softening point lower than that of the conventional lead-silicate-glass-based glaze, the glost-firing temperature can be made as low as 800° to 950° C. Therefore, even in the case where glost firing is performed concurrently with glass sealing as mentioned above, the center electrode and the below-described terminal metal piece are not susceptible to oxidization. Further, since the amount of the alkali metal components is reduced, the glaze layer provides excellent insulation performance (which leads to excellent flashover prevention). Moreover, the addition of the oxides of Ti and Zr improves water resistance or chemical resistance of the obtained glaze layer. For example, even if the alkali metal components are contained in the glaze layer, elution of the components is suppressed, resulting in improved withstand voltage of the glaze layer. The Zr component has a more significant effect of improving chemical resistance of the glaze layer than does the Ti component. In the present invention, the expression "excellent water resistance" refers not only to the case in which components of the formed glaze layer are difficult to elute into water, but also to the case in which, when glaze frit is allowed to stand in water for a long time in the form of aqueous slurry, increase in viscosity of the slurry due to elution of its components is impaired.

In the second mode, if the total amount of the alkali metal components is in excess of 12% by weight, there cannot be attained the remarkable effects characteristic to the second mode, such as improved fluidity of the glaze slurry and uniform thickness and fewer defects of the obtained glaze layer. Also, addition of the alkali metal components in an amount over the range provides adverse affects in terms of securing the insulation performance of the glaze. On the other hand, since increase of the softening point is suppressed through addition of oxides of Ti and Zr to the glaze layer, the amount of the alkali metal components can be reduced to a level at which the glaze contains substantially no alkali metal components, except for alkali metal components which migrate, for example, from raw materials. For example, reducing the amount to less than 6% by weight, preferably less than 5% by weight, yields a more significant effect of improving the insulation performance. If the alkali metal component must be added in a certain amount in order to obtain a proper glost-firing point, adequate fluidity of the molten glaze, and the like, addition of two or more alkali metal components is more effective in terms of improvement of the insulation performance, as in the case of the first mode.

If the total amount of Ti and Zr is less than 2% by weight as reduced to the respective oxides, the effect of suppressing increase in the softening point of the glaze becomes insufficient, which can lead to a failure to attain glost firing at the desired temperature. By contrast, if the total amount is in excess of 10% by weight, the glost-fired glaze layer disadvantageously becomes susceptible to devitrification. Also, if the oxides of Ti and Zr are added in proper amounts, the softening point of the glaze is lowered through, for example, eutectic reaction of the oxide with other oxides. However, since each of the oxides of Ti and Zr is substantially a high-melting-point oxide, if the total amount of the oxides is in excess of 10% by weight, the softening point of the glaze is adversely increased, which can lead to a failure to attain glost firing at the desired temperature. Preferably, the total amount of Ti and Zr is 3 to 8% by weight as reduced to the respective oxides.

Since Zr increases the viscosity of the molten glaze to a slightly greater extent than does Ti, the Zr content is 3.4% by weight or less, preferably 3.0% by weight or less as reduced to $ZrO_2$, as in the case of the second aspect, in order to increase the fluidity of molten glaze and to form a uniform glaze layer having excellent appearance.

On the other hand, since Ti does not increase the viscosity of the molten glaze to the extent that Zr does, the Ti content is set to 1.5% by weight or more as reduced to $TiO_2$, as in the case of the third aspect, to thereby advantageously form a glaze layer having more excellent water resistance or chemical resistance.

When Ti is added in an excessive amount, the coefficient of linear expansion of the glaze layer is excessively low. In this case, if the insulator to be coated with the glaze is formed of, for example, alumina-based insulating material, the difference between the coefficient of linear expansion of the insulator and that of the glaze can induce defects such as crazing in the glaze layer. Therefore, Ti and Zr are preferably added in combination in order to prevent the defects and to increase the fluidity of the molten glaze so as to obtain a uniform glaze layer having excellent appearance, as well as excellent water resistance or chemical resistance. Specifically, as in the case of the fourth aspect, WTi/WZr is 0.2 to 10, wherein WZr represents Zr content as reduced to $ZrO_2$, and WTi represents Ti content as reduced to $TiO_2$. If WTi/WZr is less than 0.2, the relative Ti content tends to be insufficient. In such a case, in order to fully obtain an effect of increasing water resistance or chemical resistance, the Zr content must be increased. As a result, the viscosity of the molten glaze is increased in some cases, resulting in impaired appearance of the glaze layer. By contrast, if WTi/WZr is in excess of 10, the Zr content must be increased in order to fully obtain an effect of increasing water resistance or chemical resistance. As a result, the coefficient of linear expansion of the glaze layer becomes excessively low, so that the glaze layer becomes susceptible to crazing and the like. Preferably, WTi/WZr is 0.5 to 7.

In the above-described second mode, the amount of Si contained in the glaze is set to 20 to 40% by weight as reduced to $SiO_2$. When the insulator to be coated with the glaze is formed of alumina-based insulating material, if the Si content is less than 20% by weight, the coefficient of linear expansion of the glaze becomes excessively high, so that the glaze layer becomes susceptible to defects such as cracks. By contrast, when the Si content is higher than 40% by weight, the coefficient of linear expansion of the glaze becomes adversely low, so that the glaze layer becomes susceptible to defects such as crazing. Also, if the Si content is 38% by weight or less as in the case of the first aspect, defects such as crazing are suppressed in the glaze layer. Preferably, the Si content is set within the range of 25 to 35% by weight as reduced to $SiO_2$.

In the second mode, the B content is 20 to 35% by weight. If the B content is less than 20% by weight, the softening point of the glaze is increased, resulting in a failure to attain glost firing at the desired temperature (800° to 950° C. as described above) By contrast, if the B content is higher than 35% by weight, there cannot be attained the remarkable effects characteristic to the second mode, such as improved fluidity of the glaze slurry, and uniform thickness and fewer defects of the obtained glaze layer. Further, there can result adverse effects involving problems as follows: the obtained glaze layer becomes more susceptible to phase splitting, resulting in devitrification; the insulation performance of the glaze layer is lowered; and a large difference is provided between the coefficient of linear expansion of the glaze layer and that of the material to be coated with the glaze. Preferably, the B content is set within the range of 20 to 28% by weight.

In order to enhance the effect of improving the fluidity of the glaze slurry, the total amount (calculated as reduced to oxides) of B and the alkali metal components is preferably 42% by weight or less, preferably 35% by weight or less. Also, in order to suppress excessive increase of the glost-firing temperature, the total amount (calculated as reduced to the respective oxides) of the alkali metal components, Ti, and Zr is preferably 8% by weight or more.

In the second mode, the Zn content is set within the range of 15 to 25% by weight as reduced to ZnO. If the Zn content is less than 15% by weight, the softening point of the glaze is increased excessively, which can lead to a failure to attain glost firing at the desired temperature. By contrast, if the Zn content is higher than 25% by weight, the coefficient of linear expansion of the glaze becomes excessively high, so that the glaze layer becomes more susceptible to defects such as cracks. The Zn content is preferably set within the range of 15 to 20% by weight, more preferably 17 to 20% by weight.

In the second mode, the Ba content is set within the range of 10 to 23% by weight as reduced to BaO. If the Ba content is less than 10% by weight, the insulation performance of the glaze is lowered, which can lead to impaired flashover prevention. By contrast, if the Ba content is higher than 23% by weight, the softening point of the glaze increases, which can lead to failure to attain glost firing at the prescribed desired temperature. Preferably, the Ba content is set within the range of 12 to 18% by weight.

In the first and second modes, the glaze contains the above-described cationic components or auxiliary cationic components mainly in the form of oxides. However, in many cases, the forms of the oxides cannot be identified; for example, because the components form amorphous glass phases. In this case, so long as the respective amounts (as reduced to oxides) of the components contained in the glaze layer fall within the above-described ranges, the spark plug formed from the glaze falls within the scope of the present invention.

The amount of each of the cationic components contained in the glaze layer formed on the insulator is identified through a known microanalysis technique such as EPMA (electric probe micro analysis), or XPS (X-ray photoelectron spectroscopy). For example, if characteristic X-rays are measured in EPMA, both the wavelength dispersive X-ray method and the energy dispersive X-ray method can be used. Alternatively, the composition can be identified through chemical analysis or gas analysis conducted on a glaze layer peeled from the insulator.

The spark plug having the above-described glaze layer according to the present invention includes a rod-shaped terminal metal piece portion. The terminal metal piece portion is disposed within the through-hole of an insulator such that it is integrated with a center electrode so as to form a single unit, or is separated from the center electrode with a conductive bonding layer disposed therebetween. In this mode, the entirety of the spark plug is maintained at 500° C., an electric current is caused to flow between the terminal metal piece portion and the metallic shell with the insulator disposed therebetween, to thereby measure the insulating resistance. In order to secure insulation durability at high temperature, the insulating resistance is preferably maintained at 200 MΩ or more, in view of prevention of flashover and the like.

FIG. 8 shows an example of a system for measuring insulating resistance. FIG. 8 depicts a spark plug 100 comprising a terminal metal piece 13 and a metallic shell 1. The terminal metal piece 13 is connected to a DC constant-voltage power supply (for example, a power supply providing 1000 V). The metallic shell 1 is grounded. An electric current is caused to flow through the spark plug 100 while the same is being heated at 500° C. in a heating furnace. For example, in the case where an applied electric current Im is measured by use of a resistor for measuring an electric current (resistance: Rm), an insulating resistance Rx to be measured is represented by an equation: (VS/Im)−Rm, wherein VS is current-carrying voltage (in FIG. 8, the applied electric current Im is measured as an output from a differential amplifier which amplifies the difference between voltages measured at the opposite ends of the resistor for measuring an electric current).

The insulator may be formed from alumina-based insulating material containing Al in an amount of 85 to 98% by weight as reduced to $Al_2O_3$. In this case, the glaze preferably has an average coefficient of linear expansion of $5.0 \times 10^{-6}/°$ C. to $8.0 \times 10^{-6}/°$ C. as measured within the temperature range from 20° C. to 350° C. If the coefficient of linear expansion falls below the lower limit, the spark plug becomes susceptible to defects such as crazing. By contrast, if the coefficient of linear expansion is above the upper limit, the spark plug becomes susceptible to defects such as cracks. More preferably, the coefficient of linear expansion is $6.0 \times 10^{-6}/°$ C. to $8.0 \times 10^{-6}/°$ C.

The coefficient of linear expansion of the glaze can be deduced from a value obtained in the following manner: Materials are mixed so as to obtain a composition substantially identical with that of the glaze; the mixture is melted so as to obtain vitreous glaze bulk; a sample is cut from the bulk; and the coefficient of expansion of the sample is measured by a known method using a dilatometer or a like technique. Alternatively, the coefficient of linear expansion of the glaze layer formed on the insulator can be measured by use of, for example, a laser interferometer or an atomic force microscope.

The spark plug according to the first mode is manufactured through a first manufacturing method of the present invention. The first manufacturing method includes a glaze powder preparation step, a glaze powder accumulation step, and a glost-firing step.

The glaze powder preparation step includes mixing source powders for Si, B, Zn, and Ba as cationic components, and source powders for two elements selected from among Na, K, and Li (co-added alkali metal components) such that the mixture contains Si in an amount of 18 to 35% by weight as reduced to $SiO_2$, B in an amount of 25 to 40% by weight as reduced to $B_2O_3$, Zn in an amount of 10 to 25% by weight as reduced to ZnO, Ba in an amount of 7 to 20% by weight as reduced to BaO, and each of the co-added alkali metal components in an amount of 3 to 9% by weight when Na is reduced to $Na_2O$, K is reduced to $K_2O$, and Li is reduced to $Li_2O$; heating and melting the mixture at 1000° to 1500° C.; rapidly cooling and vitrifying the molten material; crushing the vitrified material into frit; and preparing glaze powder from the frit.

The glaze powder accumulation step includes applying the glaze powder on the surface of an insulator so as to form a glaze-powder-accumulated layer.

The glost-firing step includes firing the insulator at 800° to 950° C. so that the glaze-powder-accumulated layer is baked and fixed on the surface of the insulator.

The spark plug of the second mode is manufactured through a second manufacturing method of the present invention. The second manufacturing method includes a glaze powder preparation step, a glaze powder accumulation step, and a glost-firing step.

The glaze powder preparation step includes mixing source powders for Si, B, Zn, and Ba as primary cationic components and source powders for at least one element selected from among Ti and Zn such that the mixture contains Si in an amount of 20 to 40% by weight as reduced to $SiO_2$, B in an amount of 20 to 35% by weight as reduced to $B_2O_3$, Zn in an amount of 15 to 25% by weight as reduced to ZnO, Ba in an amount of 10 to 23% by weight as reduced to BaO, and Ti and/or Zr in a total amount of 2 to 10% by weight as reduced to $TiO_2$ and/or $ZrO_2$; heating and melting the mixture at 1000° to 1500° C.; rapidly cooling and vitrifying the molten material; crushing the vitrified material into frit; and preparing glaze powder from the frit.

The glaze powder accumulation step includes applying the glaze powder on the surface of an insulator so as to form a glaze-powder-accumulated layer.

The glost-firing step includes firing the insulator at 800° to 950° C. so that the glaze-powder-accumulated layer is baked and fixed on the surface of the insulator.

As the source powder for each of the components (not only a source powder for a cationic component, a source powder for an auxiliary cationic component is included), there may be used a variety of inorganic material powders of hydroxides, carbonates, chlorides, sulfates, nitrates, and phosphates of the component, in addition to the oxides (including compound oxides) of the component. These inorganic material powders must be those which can be converted to oxides through heating and melting. Rapid cooling may be effected by spraying the molten material onto the surface of a cooling roll so as to obtain rapidly-cooled solidified material in the form of flakes, in addition to a method of immersing the molten material in water.

The frit for the glaze powder may be dispersed in water or solvent so as to obtain glaze slurry. In this case, the glaze slurry is applied on the surface of the insulator and dried so that a glaze slurry coating can be formed as a glaze-powder-accumulated layer. As a method of applying the glaze slurry on the surface of the insulator, there may be used a method of spraying the glaze slurry through a spray nozzle, which facilitates formation of a glaze-powder-accumulated layer having a uniform thickness and regulation of a thickness of the layer.

A proper amount of clay minerals or organic binders may be added to the glaze slurry in order to enhance shape-retaining performance of the thus-formed glaze-powder-accumulated layer. Examples of usable clay minerals include those containing aluminosilicate hydrates as the main components, such as a clay mineral containing, as the main components, at least one of allophene, imogolite, hisingerite, smectite, kaolinite, halloysite, montmorilonite, illite, vermiculite, dolomite, and the like, as well as compounds thereof. Also, from the viewpoint of oxide components contained, there may be used a clay mineral containing, as the main components, at least one of $Fe_2O_3$, $TiO_2$, $CaO$, $MgO$, $Na_2O$, $K_2O$, and the like in addition to $SiO_2$ and $Al_2O_3$.

The spark plug of the present invention includes the through-hole, the terminal metal piece, the center electrode, and the sintered conductive material portion (including conductive glass seal layers, and a resistor). The through-hole is axially formed through the insulator. The terminal metal piece is fixed at one end of the through-hole, and the center electrode is fixed at the other end of the through-hole. The sintered conductive material portion is formed from a mixture of glass and conductive material, and is disposed within the through-hole and between the terminal metal piece and the center electrode so as to electrically connect these components to each other.

The spark plug is manufactured by a method comprising the following steps:

Assembly manufacture step: An assembly is manufactured as follows. A terminal metal piece is fixed to one end of a through-hole of an insulator, and a center electrode is fixed to the other end of the through-hole. A sintered conductive raw powder containing mainly glass and conductive material is charged into a space between the terminal metal piece and the center electrode within the through-hole so as to form a powder-charged layer.

Glost-firing step: The following two procedures are performed concurrently. The assembly having a glaze-powder-accumulated layer formed on the surface of the insulator is heated at 800° to 950° C. so as to bake and fix the layers on the surface of the insulator, to thereby form a glaze layer, and the glass powder in the powder-charged layer is softened.

Press step: The center electrode and the terminal metal piece are brought into close proximity within the through-hole, so that the powder-charged layer is pressed between the center electrode and the terminal metal piece, to thereby establish a sintered conductive material portion.

In this case, the center electrode and the terminal metal piece are electrically connected to each other via the sintered conductive material portion, and the space between the inner surface of the through-hole and the center electrode or the terminal metal piece is sealed. Therefore, the above-described glost-firing step and press step provides a glass seal step. The present method is efficient, since the glass seal step and glost-firing step are performed at the same time. Also, since the above-described glaze is used, the glost-firing temperature can be made as low as 800° to 950° C. As a result, defective products stemming from oxidation of the center electrode and the terminal metal piece are seldom produced, resulting in increased product yield of the spark plug.

In this case, the softening point of the glaze is preferably regulated within the range of 600° to 700° C. If the softening point is higher than 700° C., the glost-firing temperature must be 950° C. or more so that the center electrode and the terminal metal piece are easily oxidized. By contrast, if the softening point is less than 600° C., the glost-firing temperature must be set to as low as 800° C. or less. In this case, glass having a low softening point must be used for the sintered conductive material portion in order to obtain excellent glass sealing. As a result, in the case where the finished spark plug is used over a long period of time at relatively high temperature, the glass contained in the sintered conductive material portion becomes easily altered. In such a case, if the sintered conductive material portion contains a resistor, performance characteristics such as service life under load can be impaired.

The softening point of the glaze is measured as follows: raw materials are mixed and melted so as to obtain a bulk of vitreous glaze; the bulk is reduced into particles having a particle size of about 10 to 100 μm; the particles are subjected to differential thermal analysis with reheating; and the subsequent peak after the first peak representing a state-changing point in an endothermal reaction (the second peak in endothermal reaction) is determined as the softening point. The softening point of the glaze layer formed on the surface of the insulator is deduced from a softening point obtained in the following manner: the amounts of the cationic components and the auxiliary cationic components contained in the glaze layer are measured; a composition as reduced to oxides is calculated based on the amounts; raw materials of oxides of the respective elements are mixed and melted so as to obtain a composition substantially identical with the obtained composition; the mixture is rapidly cooled so as to obtained a vitreous sample; and the softening point of the vitreous sample is measured.

The insulator on which the glaze layer is formed can be formed from an alumina-based insulating material which contains Na in an amount of 0.07 to 0.5% by weight as reduced to $Na_2O$. In the following description, unless otherwise specified, "Na content" refers to the amount of contained Na as reduced to $Na_2O$.

Accordingly, it is a first object of the present invention to provide a spark plug comprising an insulator and a glaze layer thereon, wherein the glaze provides high insulation performance and can be glost-fired at a relatively low temperature as compared with conventional glaze.

It is a second object of the present invention to provide a method of manufacturing the spark plug.

It is a third object of the present invention to provide a spark plug in which the amount of Pb contained in glaze is remarkably reduced so as to meet growing demands to protect the environment.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which:

FIGS. 11A, 11B, 11C and 11D show the glass sealing steps; and

DESCRIPTION OF THE PREFERRED EMBODIMENTS

Modes of the present invention will next be described with reference to embodiments shown in drawings.
Embodiment 1

Figure 1:
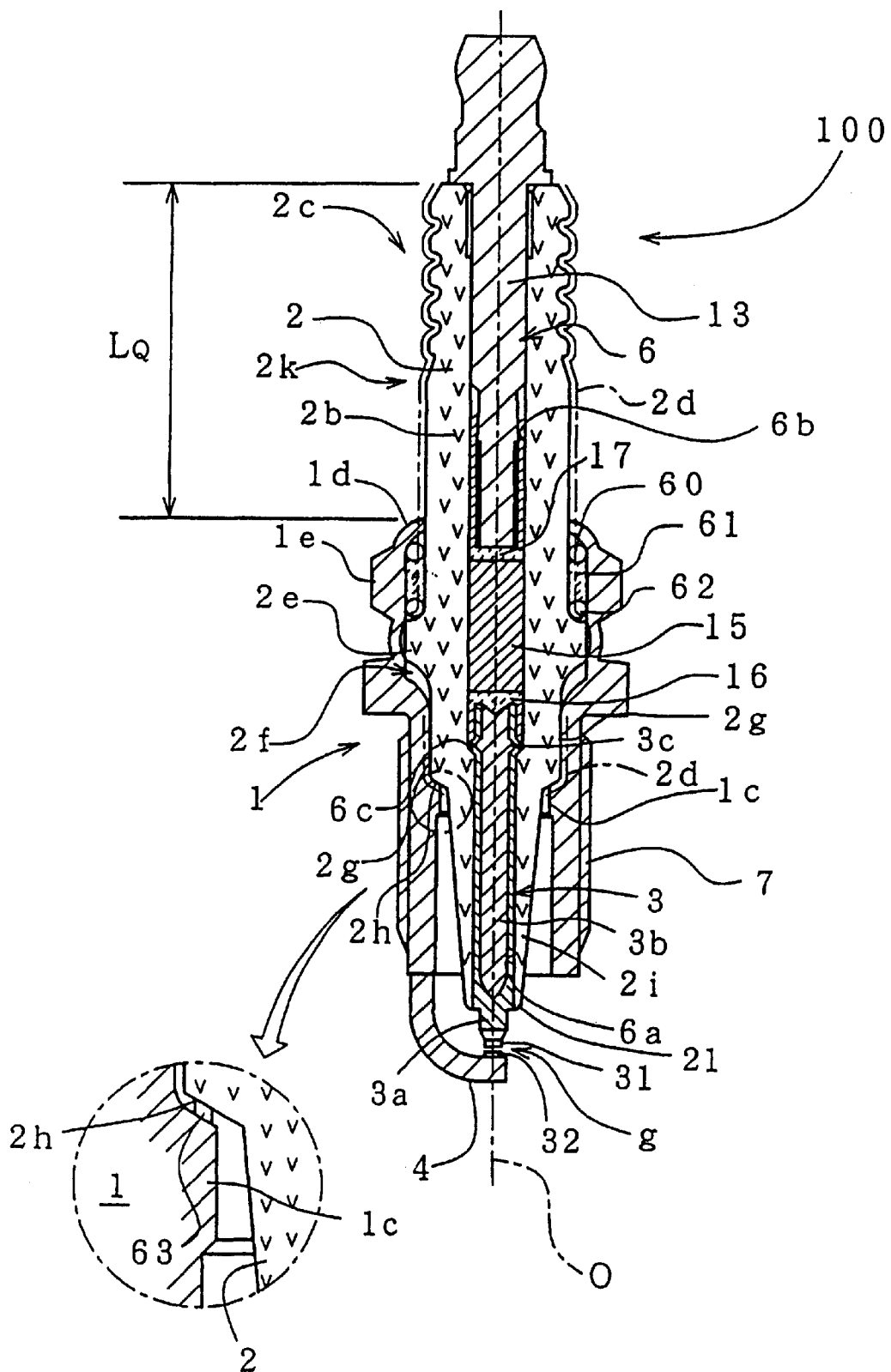
FIG. 1 is a cross-sectional view showing an embodiment of the spark plug according to the first mode of the present invention.
Figure 2A:
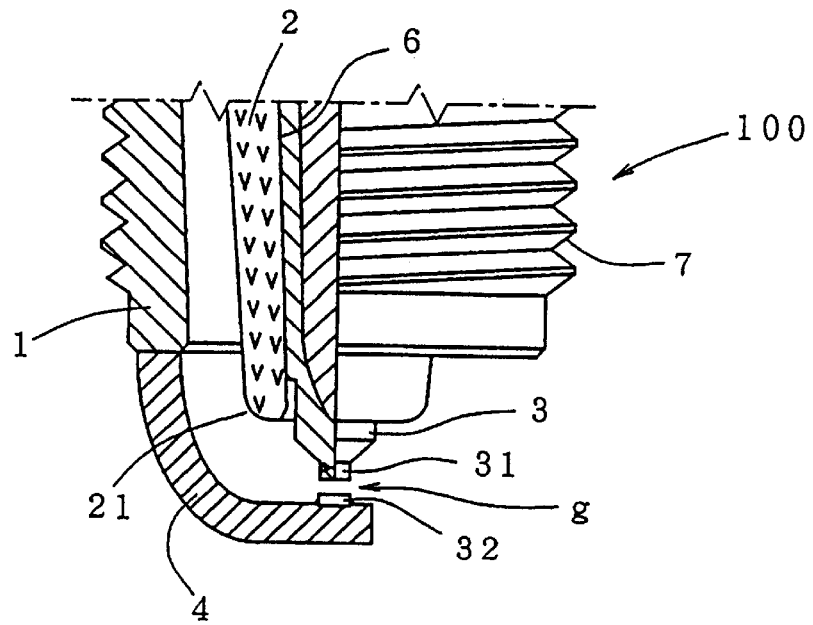
FIG. 2A is a partial, cross-sectional view showing a main portion of the spark plug of FIG. 1.

FIGS. 1 and 2 show an embodiment of a spark plug according to the first mode of the present invention. A spark plug 100 comprises a cylindrical metallic shell 1, an insulator 2, a center electrode 3, and a ground electrode 4. The insulator 2 is fitted into the metallic shell 1 such that a tip portion 21 of the insulator 2 projects from the metallic shell 1. The center electrode 3 is disposed inside the insulator 2 such that a spark discharge portion 31 formed at the tip end of the center electrode 3 projects from the insulator 2. One end of the ground electrode 4 is connected to the metallic shell 1 through welding or a like technique, while the other end portion of the ground electrode 4 is curled so as to face the tip end of the center electrode 3. A spark discharge portion 32 facing the spark discharge portion 31 is formed on the ground electrode 4. A spark discharge gap g is formed between the spark discharge portions 31 and 32 which face each other.

The metallic shell 1 is formed into a cylindrical shape from metal such as low carbon steel. The cylindrical metallic shell 1 serves as a housing of the spark plug 100. A threaded portion 7 for attachment to an unillustrated engine block is formed on the outer circumferential surface of the cylindrical metallic shell 1. The metallic shell 1 also includes a tool engagement portion 1e having a hexagonal lateral cross-section for engagement with a spanner or a wrench.

A through hole 6 is axially formed in the insulator 2. A terminal metal piece 13 is inserted into the through hole 6 and is fixedly located at the tail-side end thereof, whereas the center electrode 3 is inserted into the through hole 6 and is fixedly located at the tip-side end thereof. In the through hole 6a, a resistor 15 is disposed between the terminal metal piece 13 and the center electrode 3. The opposite ends of the resistor 15 are electrically connected to the center electrode 3 and the terminal metal piece 13 via conductive glass seal layers 16 and 17, respectively. The resistor 15 and the conductive glass seal layers 16 and 17 constitute a sintered conductive material portion. The resistor 15 is made of a resistor composition prepared by heating and pressing, during the below-described glass sealing step, a mixture comprising glass powder and conductive material powder (and ceramic powder other than glass as needed). There may be employed an alternative structure in which the resistor 15 is omitted and the terminal metal piece 13 and the center electrode 3 are integrated via a single conductive glass seal layer.

The insulator 2 has a through hole which axially extends in the interior thereof for accommodating the center electrode 3. The entire insulator 2 is formed of an insulating material containing alumina as a main component, i.e., a sintered body of alumina ceramic containing Al in an amount of 85 to 98% (preferably 90 to 98%) by weight as reduced to $Al_2O_3$.

Specific examples of the components other than Al include:

Si component: 1.50 to 5.00% by weight as reduced to $SiO_2$;

Ca component: 1.20 to 4.00% by weight as reduced to CaO;

Mg component: 0.05 to 0.17% by weight as reduced to MgO;

Ba component: 0.15 to 0.50% by weight as reduced to BaO; and

B component: 0.15 to 0.50% by weight as reduced to $B_2O_3$.

As shown in FIG. 1, the insulator 2 has a projecting portion 2e having a shape of, for example, a flange and projecting radially outward from the axially central portion of the insulator 2. In this context, the direction toward the tip end portion of the center electrode 3 (as viewed in FIG. 1) is taken as the front side. The insulator 2 also has a body portion 2b which is formed on the rear side of the projecting portion 2e, as well as a first axis portion 2g and a second axis portion 2i, which are formed in front of the projecting portion 2e in this sequence from the front side to the rear side. The body portion 2b has a diameter smaller than that of the projecting portion 2e. The first axis portion 2g has a diameter smaller than that of the projecting portion 2e. The second axis portion 2i has a diameter smaller than that of the first axis portion 2g. A corrugated portion 2c is formed on the circumferential surface of the rear end portion of the body portion 2b. The first axis portion 2g has a substantially cylindrical circumferential surface. The second axis portion 2i has a substantially conical circumferential surface whose diameter decreases toward the tip end.

The area of the lateral cross-section of the center electrode 3 is made smaller than that of the resistor 15. The through hole 6 formed in the insulator 2 includes a substantially cylindrical first portion 6a and a substantially cylindrical second portion 6b. The center electrode 3 is inserted through the first portion 6a. The second portion 6b is located on the tail side (on the upper side in FIG. 1) of the first portion 6a and has a diameter larger than that of the first portion 6a. As shown in FIG. 1, the terminal metal piece 13 and the resistor 15 are accommodated within the second portion 6b, and the center electrode 3 is inserted through the first portion 6a. A circumferential projection 3c for fixing the center electrode 3 is projected outward from the outer circumferential surface of a tail end portion thereof. The first portion 6a and the second portion 6b of the through hole 6 are connected with each other within the first axis portion 2g of FIG. 4A. At this connection position, a projection reception surface 6c for receiving the projection 3a of the center electrode 3 is provided between the first portion 6a and the second portion 6b of the through hole 6. The projection reception surface 6c assumes the form of a tapered surface or a curved surface.

A connection portion 2h between the first axis portion 2g and the second axis portion 2i has a stepped circumferential surface. An inwardly projecting portion 1c is formed on the inner surface of the metallic shell 1, and serves as an engagement portion of the metallic shell 1. The stepped circumferential surface engages the inwardly projecting portion 1c via a ring-shaped plate packing 63, to thereby prevent axial sliding out. A wire ring packing 62 is disposed between the inner surface of the rear opening portion of the metallic shell 1 and the outer surface of the insulator 2. The wire ring packing 62 engages the rear peripheral edge of the flange-like projecting portion 2e. A wire ring packing 60 is disposed in the rear of the wire ring packing 62 via a stuffed portion 61 which is stuffed with material such as talc. The insulator 2 is inserted into the metallic shell 1 from the rear opening and pushed forward. While the insulator 2 and the metallic shell 1 are held in this state, the opening edge of the metallic shell 1 is inwardly caulked against the packing 60, to thereby form a caulking portion ld which fixes the metallic shell 1 to the insulator 2.

Figures 4A, 4B:
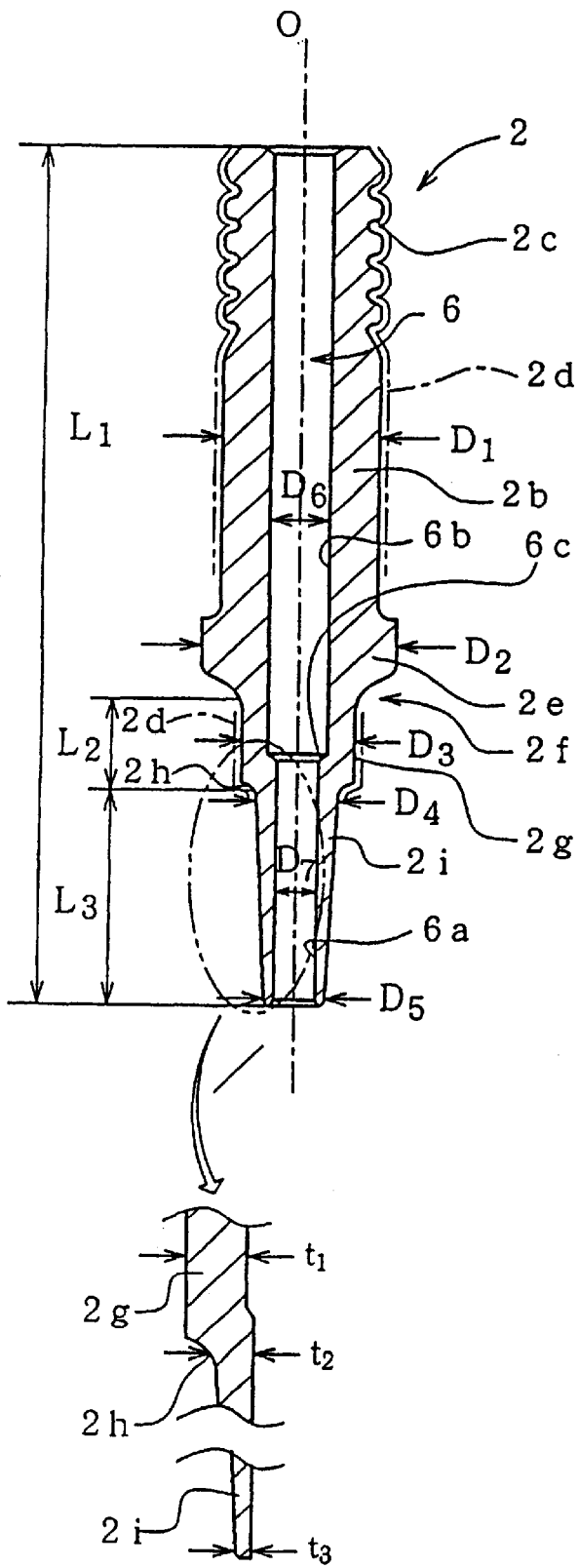
FIGS. 4A and 4B are views showing two embodiments of the insulator.

FIGS. 4A and 4B show two embodiments of the insulator 2. The following are exemplary dimensions of the portions of the embodiments:

Overall length L1: 30 to 75 mm

Length L2 of the first axis portion 2g: 0 to 30 mm (not including the connection portion 2f for connection with the projecting portion 2e, but including the connection portion 2h for connection with the second axis portion 2i)

Length L3 of the second axis portion 2i: 2 to 27 mm

Outer diameter D1 of the body portion 2b: 9 to 13 mm

Outer diameter D2 of the projecting portion 2e: 11 to 16 mm

Outer diameter D3 of the first axis portion 2g: 5 to 11 mm

Outer diameter D4 of the bottom end portion of the second axis portion 2i: 3 to 8 mm Outer diameter D5 of the tip end portion of the second axis portion 2i (when the peripheral edge of the outer tip end surface is curved or chamfered, D5 denotes the outer diameter as measured at the foot position of the curved or chamfered portion, as viewed in the cross-section including the center axis O): 2.5 to 7 mm Inner diameter D6 of the second portion 6b of the through hole 6: 2 to 5 mm Inner diameter D7 of the first portion 6a of the through hole 6: 1 to 3.5 mm Wall thickness t1 of the first axis portion 2g: 0.5 to 4.5 mm Wall thickness t2 of the bottom end portion of the second axis portion 2i (as measured in the direction orthogonal to the center axis O): 0.3 to 3.5 mm Wall thickness t3 of the tip end portion of the second axis portion 2i (as measured in the direction orthogonal to the center axis O; when the peripheral edge of the outer tip end surface is curved or chamfered, t3 denotes the wall thickness as measured at the foot position of the curved or chamfered portion, as viewed in the cross-section including the center axis O): 0.2 to 3 mm Average wall thickness tA ((t2+t3)/2) of the second axis portion 2i: 0.25 to 3.25 mm In FIG. 1, a portion 2k of the insulator 2 projects rearward from the metallic shell 1 and has a length LQ of 23 to 27 mm (for example, about 25 mm). As viewed in a longitudinal cross-section including the center axis O of the insulator 2, the length LP of the projecting portion 2k of the insulator 2 as measured along the contour of the cross-section between the position corresponding to the rear edge of the metallic shell 1, via the corrugated portion 2c, and the rear end edge of the insulator 2 is 26 to 32 mm (for example, about 29 mm).

For example, the dimensions of the insulator 2 shown in FIG. 4A are as follows: L1=about 60 mm, L2=about 10 mm, L3=about 14 mm, D1=about 11 mm, D2=about 13 mm, D3=about 7.3 mm, D4=about 5.3 mm, D5=about 4.3 mm, D6=about 3.9 mm, D7=about 2.6 mm, t1=3.3 mm, t2=1.4 mm, t3=0.9 mm, tA=1.15 mm.

In the insulator 2 shown in FIG. 4B, each of the first axis portion 2g and the second axis portion 2i has a slightly larger outer diameter as compared with that as shown in FIG. 4A. For example, the dimensions of the portions of the insulator 2 may be as follows: L1=about 60 mm, L2=about 10 mm, L3=about 14 mm, D1=about 11 mm, D2=about 13 mm, D3=about 9.2 mm, D4=about 6.9 mm, D5=about 5.1 mm, D6=about 3.9 mm, D7=about 2.7 mm, t1=3.3 mm, t2=2.1 mm, t3=1.2 mm, tA=1.65 mm.

Figure 3:
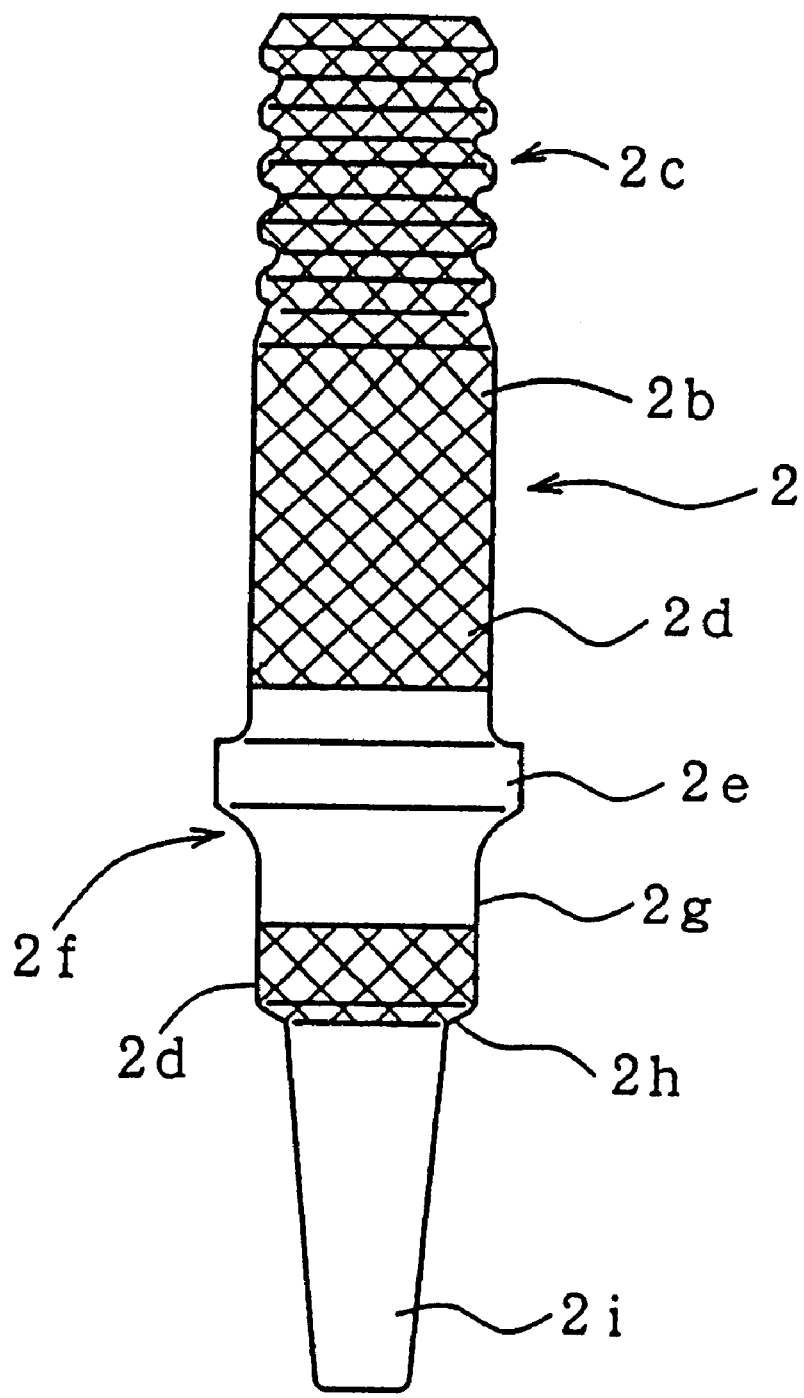
FIG. 3 is a view showing the appearance of an insulator having a glaze layer.

Next, as shown in FIG. 3, a glaze layer 2d is formed on a surface of the insulator 2; specifically, the outer circumferential surface of the body portion 2b including the corrugated portion 2c and the outer circumferential surface of the first axis portion 2g. The formed glaze layer 2d has a thickness of 10 to 150 $\mu$m, preferably 20 to 50 $\mu$m. As shown in FIG. 1, the glaze layer 2d formed on the body portion 2b extends, by a predetermined length, in the axially front direction inside the metallic shell 1, whereas the rear portion of the glaze layer 2d extends to the rear position of the body portion 2b. On the other hand, the glaze layer 2d formed on the first axis portion 2g covers the area where the portion 2g contacts the inner circumferential surface of the metallic shell 1; e.g., the area extending from the axially intermediate position of 2g to the position where the plate packing 63 abuts.

The glaze layer 2d is formed of a glaze which comprises primary cationic components of Si, B, Zn, and Ba, and two elements (co-added alkali metal components) selected from among Na, K, and Li. The glaze contains Si in an amount of 18 to 35% by weight as reduced to $SiO_2$, B in an amount of 25 to 40% by weight as reduced to $B_2O_3$, Zn in an amount of 10 to 25% by weight as reduced to ZnO, and Ba in an amount of 7 to 20% by weight as reduced to BaO. The two co-added alkali metal components are each incorporated in an amount of 3 to 9% by weight in terms of $Na_2O$, $K_2O$, or $Li_2O$.

Specifically, the glaze contains Si in an amount of 18 to 35% by weight as reduced to $SiO_2$, B in an amount of 25 to 40% by weight as reduced to $B_2O_3$, Zn in an amount of 10 to 25% by weight as reduced to ZnO, Ba in an amount of 7 to 20% by weight as reduced to BaO, Na in an amount of 3 to 9% by weight as reduced to $Na_2O$, and K in an amount of 3 to 9% by weight as reduced to $K_2O$. The total amount of Si, B, Zn, Ba, and co-added alkali metal components as reduced to respective oxides is 95% by weight or more. The glaze contains substantially no Pb. If the glaze contains Pb, the amount of Pb is 1.0% by weight or less as reduced to PbO. Further, the glaze may contain, as auxiliary cationic components, one or more elements selected from among Al, Ca, Fe, Zr, Ti, Sr, Mg, Bi, Ni, Sn, P, and Mn. The total amount of the auxiliary cationic components is 5% by weight or less, provided that Al is calculated as reduced to $Al_2O_3$, Ca is calculated as reduced to CaO, Fe is calculated as reduced to $Fe_2O_3$, Zr is calculated as reduced to $ZrO_2$, Ti is calculated as reduced to $TiO_2$, Sr is calculated as reduced to SrO, Mg is calculated as reduced to MgO, Bi is calculated as reduced to $Bi_2O_3$, Ni is calculated as reduced to NiO, Sn is calculated as reduced to $SnO_2$, P is calculated as reduced to $P_2O_5$, and Mn is calculated as reduced to MnO.

Figure 2B:
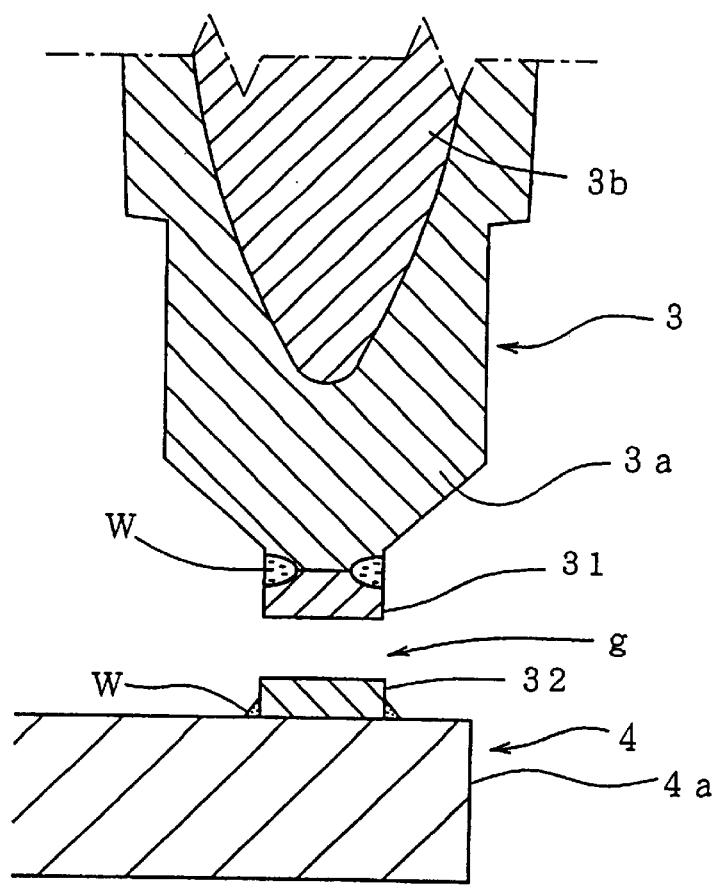
FIG. 2B is an enlarged cross-sectional view showing the spark discharge portion and its vicinity in the main portion.

The body portion 3a of the center electrode 3 and the body portion 4a of the ground electrode 4 are formed of Ni alloy or a like alloy. A core material 3b formed of Cu, Cu alloy, or a like material is embedded in the body portion 3a of the center electrode 3. The spark discharge portion 31 and the spark discharge portion 32 facing the spark discharge portion 31 are formed predominantly of a noble metal alloy primarily containing one or more elements selected from among Ir, Pt, and Rh. As shown in FIG. 2B, the body portion 3a of the center electrode 3 has a tip end portion whose diameter decreases toward the flat tip end surface thereof. A disk-shaped chip is placed on the tip end surface of the center electrode 3. The disk-shaped chip is formed of an alloy having the same composition as the alloy forming the above-mentioned spark discharge portions. Subsequently, a weld zone W is formed along the boundary between the chip and the tip end portion through laser welding, electron beam welding, resistance welding, or a like welding method, thereby fixedly attaching the chip onto the tip end portion and forming the spark discharge portion 31. Likewise, a chip is placed on the ground electrode 4 at a position corresponding to the spark discharge portion 31; thereafter, the weld zone W is formed along the boundary between the chip and the ground electrode 4 so as to attach the chip fixedly onto the ground electrode 4, to thereby form the spark discharge portion 32. These chips may be formed from a molten material which is obtained through mixing and melting of alloy components so as to attain the above-mentioned composition. Alternatively, the chips are formed of a sintered material obtained through compacting and sintering an alloy powder or a mixture of powdery elemental metals mixed at predetermined proportions. In this structure, at least one of the spark discharge portion 31 and the spark discharge portion 32 facing the spark discharge portion 31 may be omitted.

The above-described spark plug 100 is manufactured, for example, by the following method. First, the insulator 2 is manufactured as follows. Raw powders for insulator 2; i.e., alumina powder and source powders of Si, Ca, Mg, Ba, and B components, are mixed at predetermined proportions so that the above-mentioned composition in terms of oxides of the elements is attained after sintering of the mixed powder. Predetermined amounts of a binder (PVA) and water are added and mixed, to thereby obtain a slurry. Examples of the source powders of respective components may be as follows: $SiO_2$ powder for Si, $CaCO_3$ powder for Ca, MgO powder for Mg, $BaCO_3$ powder for Ba, and $H_3BO_3$ powder for B. Also, $H_3BO_3$ may be added in the form of a solution.

Figure 9:
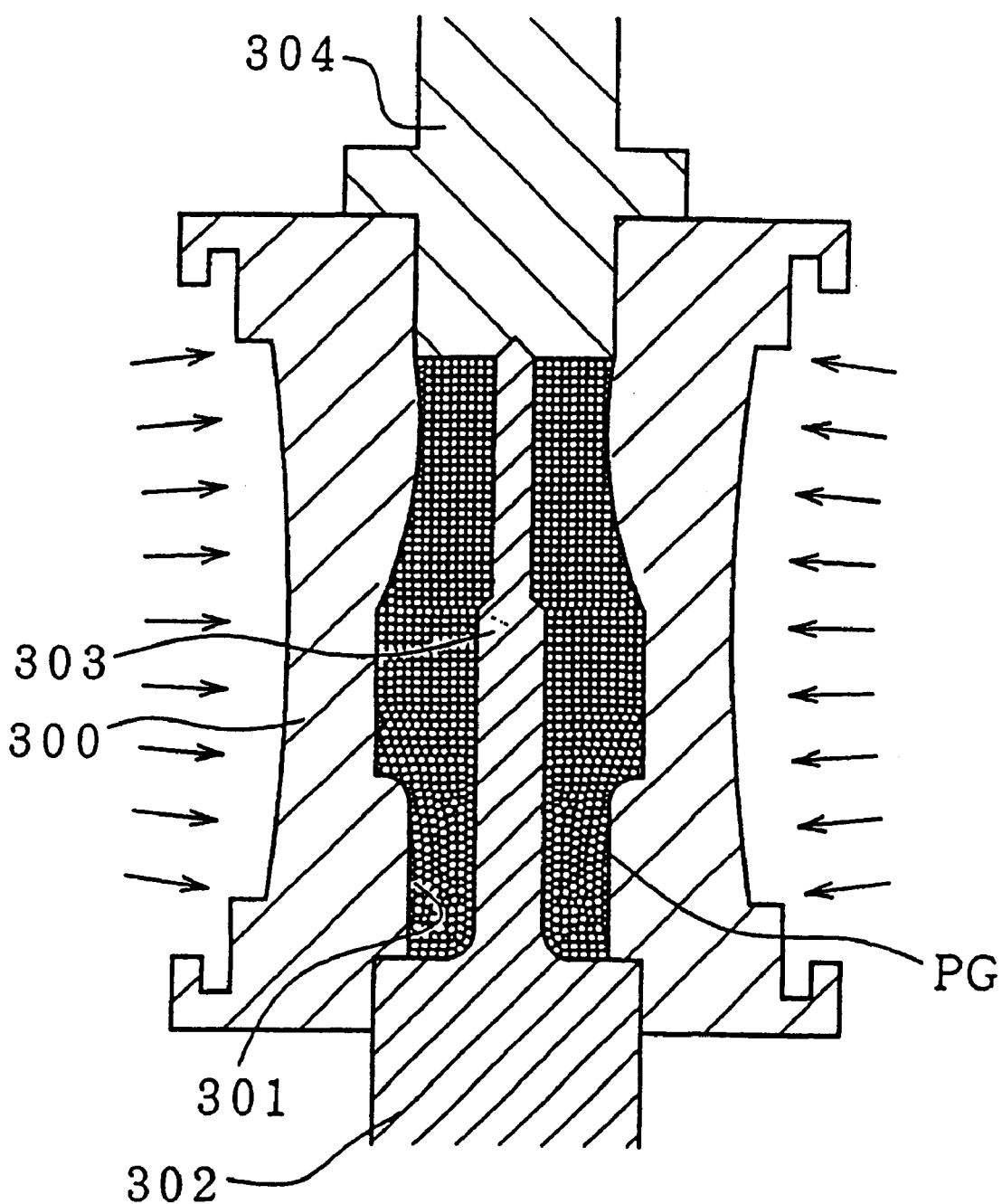
FIG. 9 is an explanatory sketch showing a rubber press method.

The slurry is sprayed and dried into granules through a spray drying method or a like technique. The granules are formed through rubber-press molding into a compact, which serves as the original form of an insulator. FIG. 9 schematically shows the process of rubber-press molding. In FIG. 9, a rubber mold 300 has a cavity 301 which axially extends through the interior of the rubber mold 300. A lower punch 302 is fitted into the cavity 301 at the lower opening portion thereof. A projecting press pin 303 is integrally formed with the lower punch 302 so that the press pin 303 axially extends, within the cavity 301, from the punch surface of the punch 302. The press pin 303 defines the shape of the through hole 6 (FIG. 1) of the insulator 2.

Figure 10:
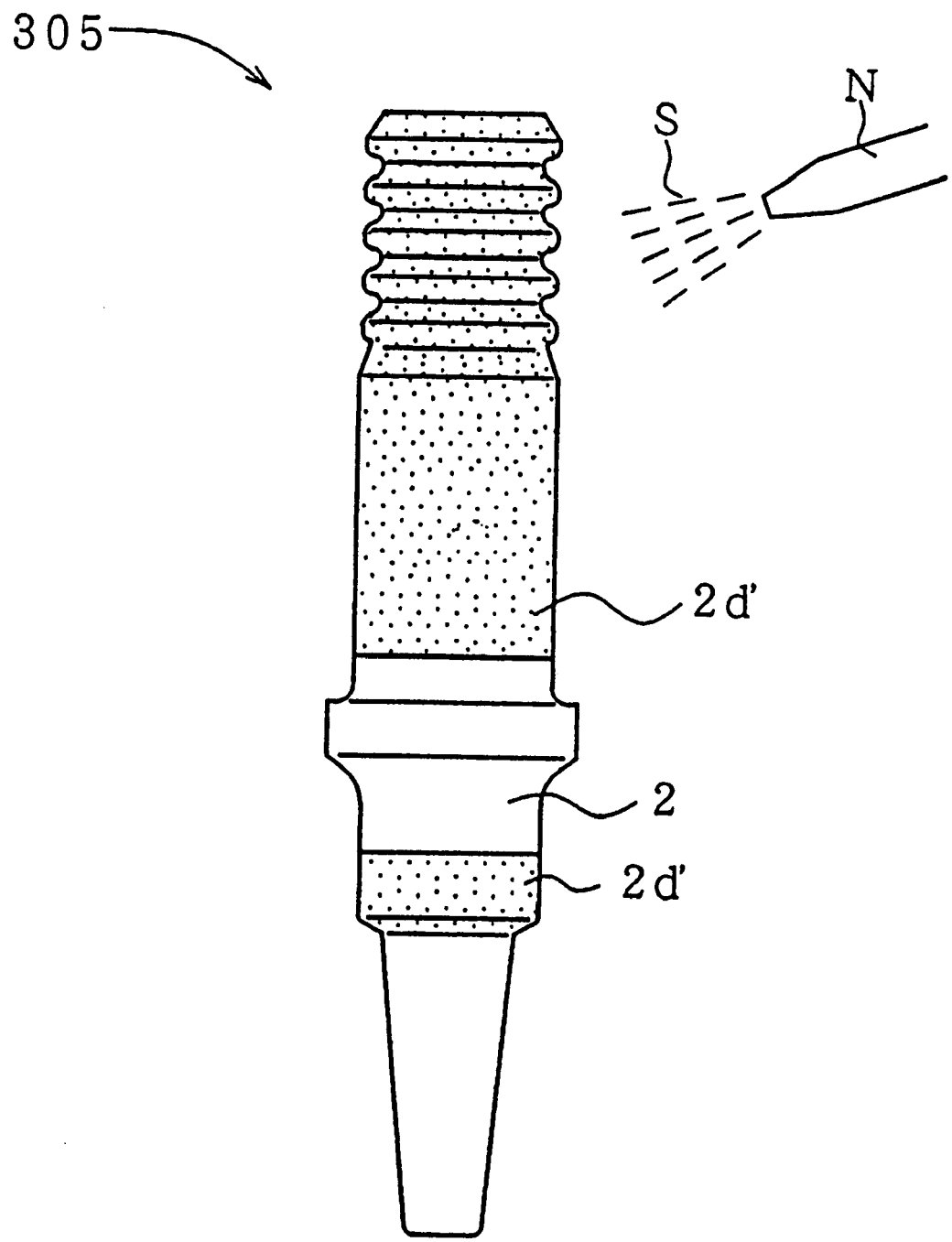
FIG. 10 is an explanatory sketch showing a step of forming a glaze slurry coating.

In this state, a predetermined amount of the granules PG are charged into the cavity 301, and the upper opening portion of the cavity 301 is closed with an upper punch 304, to thereby seal the cavity 301. In this state, hydraulic pressure is applied from outside the circumferential surface of the rubber mold 300 so as to compress the granules PG within the cavity 301 via the rubber mold 300, thereby obtaining a compact 305 as shown in FIG. 10. Before the above-described press-molding, moisture in an amount of 0.7 to 1.3 wt. % with respect to 100 wt. % of the granules PG is added to the granules PG in order to facilitate reduction of granules PG into particulate grains under pressure. The outer surface of the compact 305 is processed through grinding or a like technique so that the compact 305 is finished to attain an exterior shape identical to that of the insulator 2 of FIG. 1. Subsequently, the compact 305 is fired at 1400° to 1600° C., to thereby obtain the insulator 2.

Independently, the glaze slurry is prepared as follows:

Source powders for providing Si, B, Zn, Ba, Na, and K components (for example, $SiO_2$ powder for Si, $H_3BO_3$ powder for B, ZnO powder for Zn, $BaCO_3$ powder for Ba, $Na_2CO_3$ powder for Na, and $K_2CO_3$ powder for K) are mixed so that the mixture contains Si in an amount of 18 to 35% by weight as reduced to $SiO_2$, B in an amount of 25 to 40% by weight as reduced to $B_2O_3$, Zn in an amount of 10 to 25% by weight as reduced to ZnO, and Ba in an amount of 7 to 20% by weight as reduced to BaO. As the co-added alkali metal components, Na is added in an amount of 3 to 9% by weight as reduced to $Na_2O$ and K is added in an amount of 3 to 9% by weight as reduced to $K_2O$. Subsequently, the mixture is heated at 1000° to 1500° C. for melting, and the molten mixture is poured into water for rapid cooling and vitrification. The vitrificated material is crushed, to thereby obtain glaze frit. To the glaze frit are added proper amounts of clay minerals, such as kaolin and gairome clay, and an organic binder. Water is added to the mixture, followed by mixing, to thereby obtain glaze slurry.

As shown in FIG. 10, the glaze slurry S is sprayed/applied through a spray nozzle N onto predetermined areas of the surface of the insulator 2 so as to form a glaze slurry coating 2d', which serves as a glaze powder accumulated layer after drying.

Next will be outlined assembly of the center electrode 3 and the terminal metal piece 13 into the insulator 2 on which the glaze slurry coating 2d' has been formed, and formation of the resistor 15 and the conductive glass seal layers 16 and 17. First, as shown in FIG. 11A, the center electrode 3 is inserted into the first portion 6a of the through hole 6 of the insulator 2. Subsequently, as shown in FIG. 11B, conductive glass powder H is charged into the second portion 6b. Subsequently, as shown in FIG. 11C, a press rod 28 is inserted into the through hole 6 for preliminary compression of the powder H, to thereby form a first conductive glass powder layer 26. Subsequently, material powder for the resistor is charged and subjected to preliminary compression. Further, conductive glass powder is charged and subjected to preliminary compression. Thus, as shown in FIG. 11D, within the through hole 6, the first conductive glass powder layer 26, a resistor material powder layer 25, and a second conductive glass powder layer 27 are layered, in this sequence from the side on which the center electrode 3 is located (from the lower side).

Figure 12A:
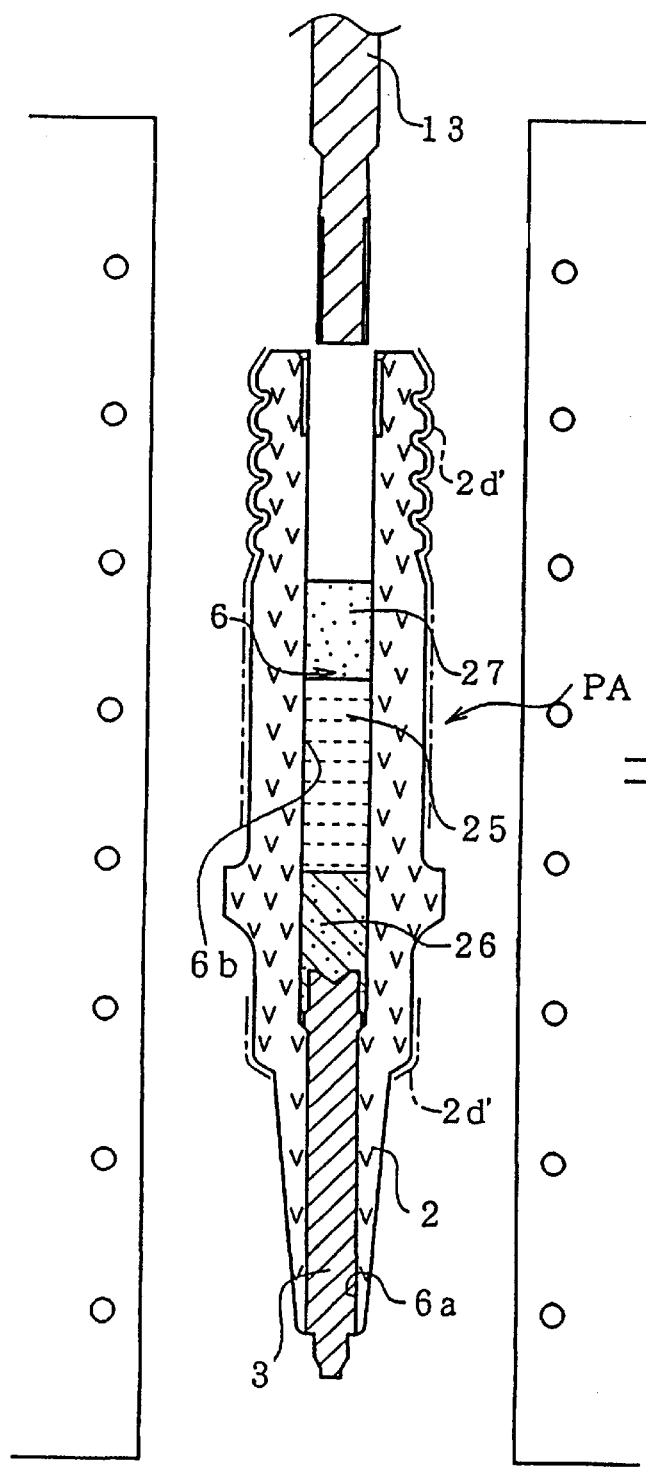
FIGS. 12A and 12B show the steps subsequent to the steps shown in FIGS. 11A through 11D.
Figure 12B:
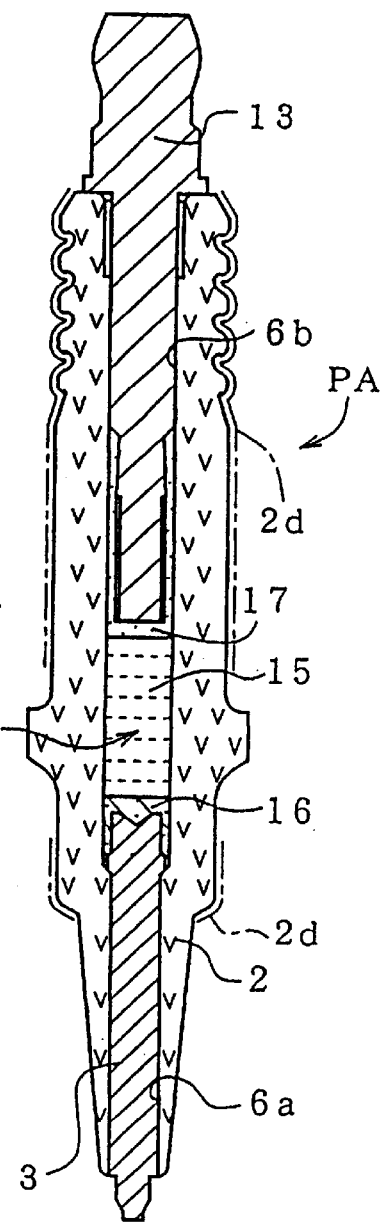

Next, as shown in FIG. 12A, the terminal metal piece 13 is inserted into the through hole 6, to thereby form a assembly PA. In this state, the entire assembly is inserted into a furnace and heated to 800° to 950° C., which is higher than the softening point of glass. Subsequently, the terminal metal piece 13 is press-fitted into the through hole 6 from the tail-side end opposite the center electrode 3 in order to axially press the layers 26, 25, and 27. In this way, press treatment is performed. As a result, as shown in FIG. 12B, the respective layers are compressed and sintered, to provide a conductive glass seal layer 16, a resistor 15, and a conductive glass seal layer 17 (the above-described process is hereinafter called a "glass sealing process").

Since the glaze frit contained in the glaze slurry coating 2d' has the above-described composition, the glaze frit has a softening point of 600° to 700° C. That is, since the amounts of Na and K in the composition are chosen to be relatively high, the softening point is lower than that of a conventional lead silicate glass glaze. Accordingly, the glost-firing temperature of the glaze frit can be decreased to as low as 800° to 950° C. Therefore, as shown in FIGS. 12A and 12B, glaze slurry coating 2d' is concurrently glost-fired into a glaze layer 2d with heating in the above-described glass sealing process. Also, from a different point of view, since the heating temperature in the glass sealing process is decreased from a conventionally-employed temperature of 900° to 1000° C. to 800° to 950° C., the surfaces of the center electrode 3 and the terminal metal piece 13 become less susceptible to oxidation. Further, since the difference between the coefficient of linear expansion of the glaze having the above-described composition and that of alumina insulator material forming the insulator 2 is relatively small, the glaze layer 2d is less susceptible to cracks and the like under cooling in the glass sealing process, which also serves as a glost-firing process.

In this way, the glass sealing process for the assembly PA is completed. Subsequently, the metallic shell 1, the ground electrode 4, and other components are attached to the assembly PA, to thereby form the spark plug 100 shown in FIG. 1. The spark plug 100 is mounted onto an engine block by means of its thread portion 7, and used as an igniter for ignition of an air-fuel mixture fed into a combustion chamber. In the spark plug 100, the glaze forming the glaze layer 2d has a considerably large amount of alkali metal components. However, since two kinds of alkali metal components, Na and K, are added in combination, conductivity is not increased considerably, thereby securing excellent insulation performance and resulting in excellent flashover prevention.

Figure 5:
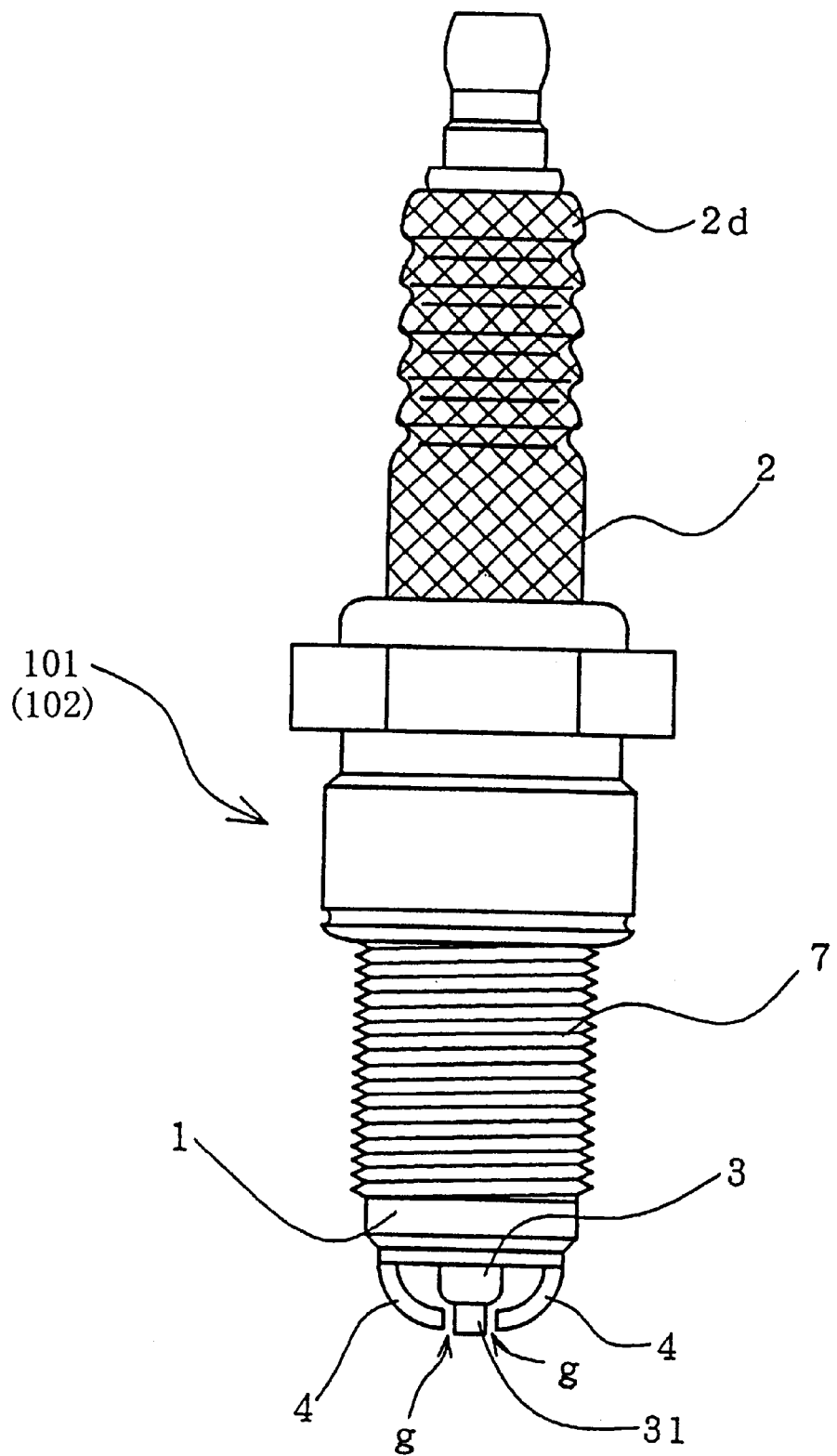
FIG. 5 is a view showing another embodiment of the spark plug of the present invention.
Figure 6A:
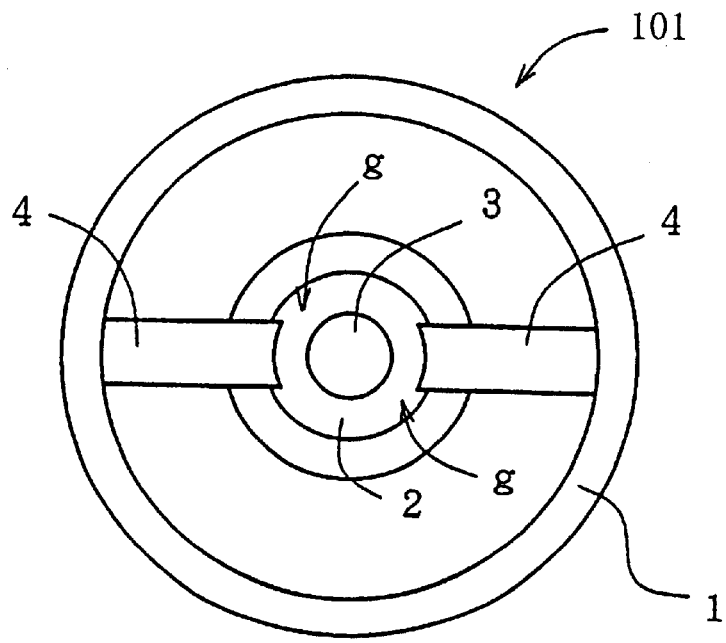
FIG. 6A is a top view showing the spark discharge portion and its vicinity of FIG. 5.
Figure 6B:
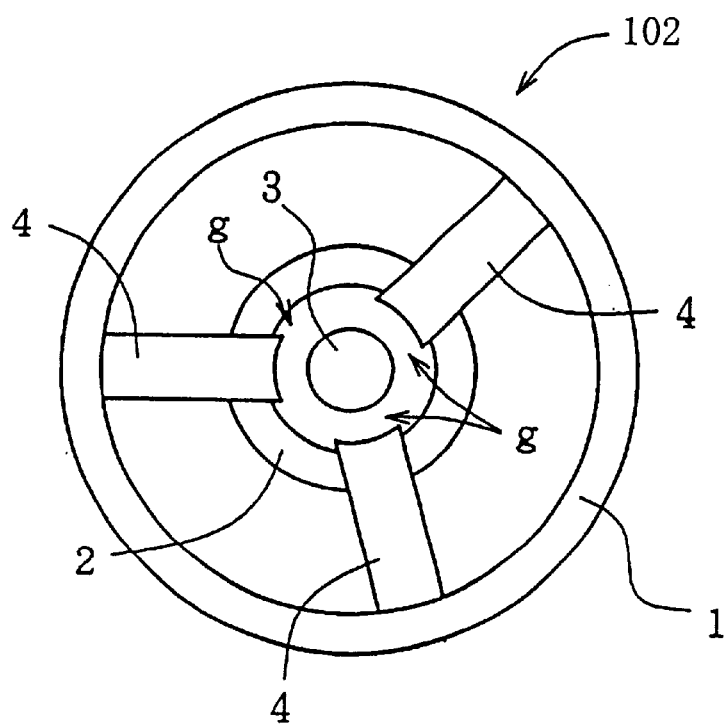
FIG. 6B is a top view showing a variation of the spark discharge portion and its vicinity of FIG. 5.
Figure 7:
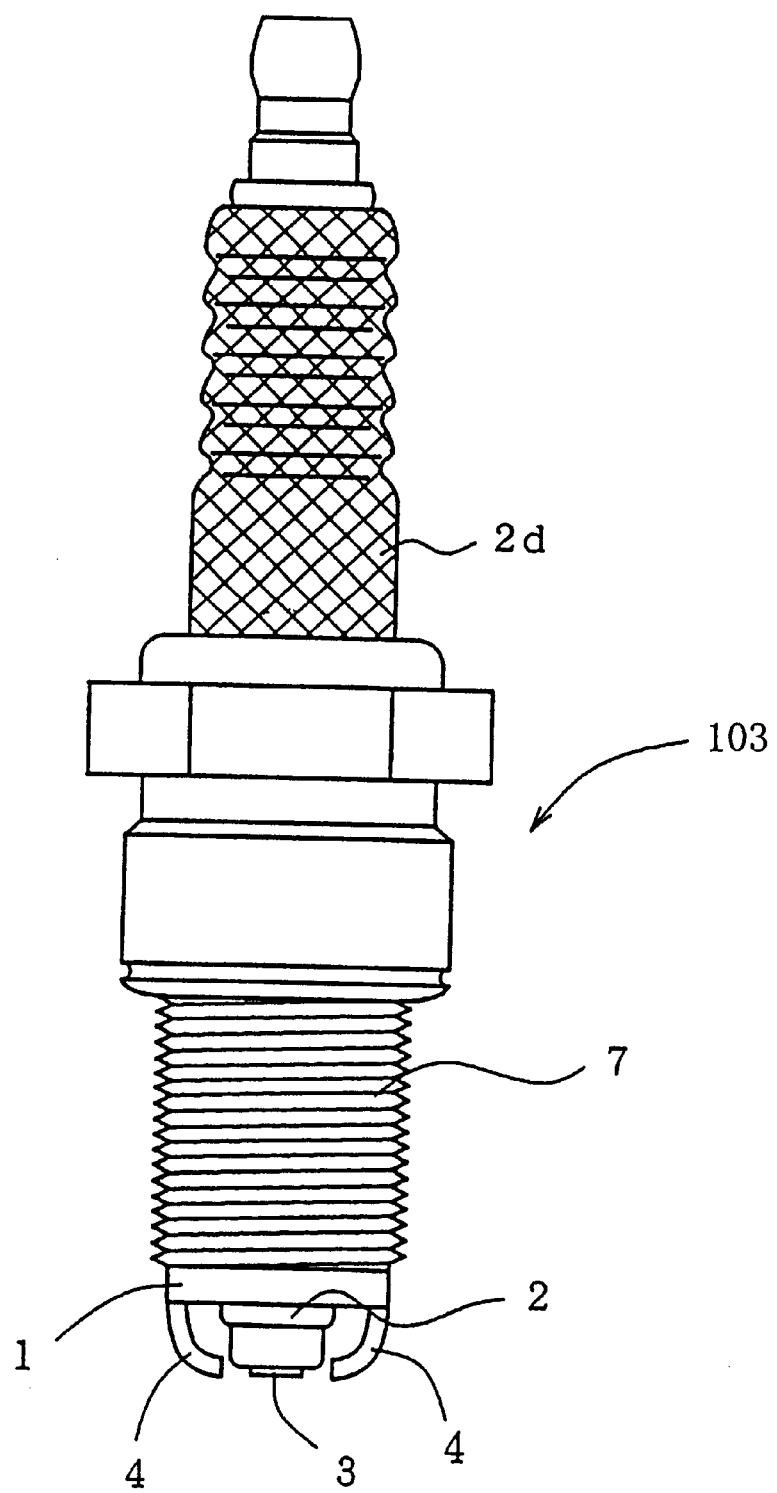
FIG. 7 is a view showing yet another embodiment of the spark plug of the present invention.

The spark plug according to the present invention is not limited to the type shown in FIG. 1, and may be of a type in which the tip end of the ground electrode 4 faces the side surface of the center electrode 3 with the gap g formed therebetween as shown in FIG. 5. In this case, there may be provided two ground electrodes 4 that face opposite sides of the center electrode 3 as shown in FIG. 6A, or three or more ground electrodes 4 located around the center electrode 3 as shown in FIG. 6B. Also, the spark plug 100 may be formed to be a semi-surface discharge plug in which the tip end portion of the insulator 2 is caused to enter the space between the side surface of the center electrode 3 and the tip end surface of the ground electrode 4. In this structure, since spark discharge is induced along the surface of the tip end portion of the insulator 2, resistance to staining is improved as compared with the case of an aerial discharge plug.

Embodiment 2

Next will be described an embodiment of a spark plug according to the second mode of the present invention. Excepting the composition of the glaze layer, the structure of Embodiment 2 of the spark plug is identical to that of Embodiment 1. Detailed description of the components other than the glaze layer will be omitted, as the same will be readily understood from FIGS. 1 to 7. The glaze layer 2d is formed of a glaze comprising Si, B, Zn, and Ba which serve as primary cationic components; at least one element selected from among Ti and Zr; and at least one element selected from among Na, K, and Li, which serve as alkali metal components. The amounts of the primary cationic components are as follows: Si: 20 to 40% by weight as reduced to $SiO_2$, B: 20 to 35% by weight as reduced to $B_2O_3$, Zn: 15 to 25% by weight as reduced to ZnO, and Ba: 10 to 23% by weight as reduced to BaO. The total amount of Ti as reduced to $TiO_2$ and Zr as reduced to $ZrO_2$ is 2 to 10% by weight. The total amount of the alkali metal components is 12% by weight or less when Na is calculated as reduced to $Na_2O$, K is calculated as reduced to $K_2O$, and Li is calculated as reduced to $Li_2O$. The Pb content as reduced to PbO is suppressed to 0.1% by weight or less.

Specifically, the above-described composition of the glaze layer may be regulated so as to satisfy at least one of the following four optional conditions: (1) Si content as reduced to $SiO_2$ is 20 to 38% by weight; (2) Zr content as reduced to $ZrO_2$ is 3.4% by weight or less; (3) Ti content as reduced to $TiO_2$ is 1.5% by weight or more; (4) WTi/WZr is 0.2 to 10, wherein WZr represents Zr content as reduced to $ZrO_2$, and WTi represents Ti content as reduced to $TiO_2$.

The method of manufacturing the spark plug 100 having the above-described glaze layer 2d is substantially the same as that of Embodiment 1 except that only the composition of the raw materials for glaze layer to be used is different. The glaze slurry is prepared as follows: Source powders for providing respective components; i.e., Si, B, Zn, Ba, and at least one element selected from among Ti and Zr (for example, $SiO_2$ powder for Si, $H_3BO_3$ powder for B, ZnO powder for Zn, $BaCO_3$ powder for Ba, $TiO_2$ powder for Ti, and $ZrO_2$ powder for Zr), are mixed so that the mixture contains Si in an amount of 20 to 40% by weight as reduced to $SiO_2$, B in an amount of 20 to 35% by weight as reduced to $B_2O_3$, Zn in an amount of 15 to 25% by weight as reduced to ZnO, Ba in an amount of 10 to 23% by weight as reduced to BaO, and a total amount of Ti as reduced to $TiO_2$ and Zr as reduced to $ZrO_2$ of 2 to 10% by weight. In the case where at least one element selected from among Na, K, and Li is added as an alkali metal component, the component source powder of each element is added such that the mixture contains a total amount of Na as reduced to $Na_2O$, K as reduced to $K_2O$, and Li as reduced to $Li_2O$ of 12% by weight or less. Subsequently, the mixture is heated at 1000° to 1500° C. for melting, and the molten material is poured into water for rapid cooling and vitrification. The vitrificated material is crushed, to thereby obtain glaze frit. The glaze frit may be blended with proper amounts of clay minerals, such as kaolin or gairome clay, and an organic binder. Water is added to the mixture, followed by mixing, to thereby obtain glaze slurry.

When the amounts of the alkali metal components and B component are determined within the above-described ranges, glaze slurry having low viscosity and sufficient fluidity is easily prepared. Referring to FIG. 10, the glaze slurry S is sprayed/applied through a spray nozzle N onto predetermined areas of the surface of the insulator 2, to thereby form a glaze slurry coating 2d' having a uniform thickness and suppressed engulfment of air bubbles or the like which may be involved in the slurry S. Detailed description of the process of obtaining the spark plug will be omitted, since the description is substantially the same as that provided for Embodiment 1. Glost-firing of the glaze slurry coating 2d' provides the glaze layer 2d having a uniform thickness and a small number of defects. Since, as in the case of Embodiment 1, the softening point of the glaze is as low as 6000 to 700° C., the heating temperature in the glass sealing process is decreased to 800° to 950° C. from a conventionally-employed temperature of 900° to 1000° C. Therefore, the surfaces of the center electrode 3 and the terminal metal piece 13 become less susceptible to oxidation. Further, since the difference between the coefficient of linear expansion of the glaze having the above-described composition and that of alumina insulator material forming the insulator 2 is relatively small, the glaze layer 2d is less susceptible to cracks and the like under cooling in the glass sealing process, which also serves as a glost-firing process. Since the glaze forming the glaze layer 2d contains a small amount of the alkali metal components, excellent insulation performance is secured, resulting in excellent flashover prevention.

In some cases, the spark plugs of Embodiments 1 and 2 may have the same type of glaze layer 2d, depending on the selection of the composition. In this case, the effects of the first mode and those of the second mode of the present invention can be obtained concurrently.

EXAMPLE EXPERIMENTS

To confirm the effects of the present invention, the following experiments were performed.

Experiment 1

An insulator 2 was formed as follows. An alumina powder (alumina: 95 wt. %, Na content (as reduced to $Na_2O$): 0.1 wt. %, average particle size: 3.0 μm) was mixed with $SiO_2$ (purity: 99.5%, average particle size: 1.5 μm), $CaCO_3$ (purity: 99.9%, average particle size: 2.0 atm), MgO (purity: 99.5%, average particle size: 2 μm), $BaCO_3$ (purity: 99.5%, average particle size: 1.5 μm), $H_3BO_3$ (purity: 99.0%, average particle size: 1.5 μm), and ZnO (purity: 99.5%, average particle size: 2.0 μm) at predetermined proportions. The resultant powder mixture in a total amount of 100 parts by weight was mixed with 3 parts by weight of PVA serving as a hydrophilic binder and 103 parts by weight of water, followed by wet-mixing, to thereby prepare a slurry.

The slurry was dried through a spray-dry method, to thereby prepare spherical granules. The granules were passed through a sieve so as to regulate the particle size to 50 to 100 μm. The granules were formed into a compact under a pressure of 50 MPa through rubber-press molding, which has been already described with reference to FIG. 9. The circumferential surface of the compact was ground to have a predetermined insulator shape. The compact was fired at 1550° C., to thereby obtain the insulator 2. Through X-ray fluorescence analysis, the insulator 2 was confirmed to have the following composition:

Al: 94.9 wt. % as reduced to $Al_2O_3$;

Si: 2.4 wt. % as reduced to $SiO_2$;

Ca: 1.9 wt. % as reduced to CaO;

Mg: 0.1 wt. % as reduced to MgO;

Ba: 0.4 wt. % as reduced to BaO; and

B: 0.3 wt. % as reduced to $B_2O_3$.

The dimensions of the insulator 2 shown in FIG. 4A are as follows: L1=about 60 mm, L2=about 8 mm, L3=about 14 mm, D1=about 10 mm, D2=about 13 mm, D3=about 7 mm, D4=5.5 mm, D5=4.5 mm, D6=4 mm, D7=2.6 mm, t1=1.5 mm, t2=1.45 mm, t3=1.25 mm, tA=1.35 mm. Further, as shown in FIG. 1, a portion 2k of the insulator 2 projecting rearward from the metallic shell 1 has a length LQ of 25 mm. As viewed in a longitudinal cross-section including the center axis O of the insulator 2, the length LP of the projecting portion 2k of the insulator 2 as measured along the contour of the cross-section between the position corresponding to the rear edge of the metallic shell 1, via the corrugated portion 2c, and the rear end edge of the insulator 2 is 29 mm.

Next, glaze slurry was prepared. First, the following raw materials were mixed at various proportions: $SiO_2$ powder (purity: 99.5%), $H_3BO_3$ powder (purity: 98.5%), ZnO powder (purity: 99.5%), $BaCO_3$ powder (purity: 99.5%), $Na_2CO_3$ powder (purity: 99.5%), $K_2CO_3$ powder (purity: 99%), $Al_2O_3$ powder (purity: 99.5%), $Fe_2O_3$ powder (purity: 99.0%), $CaCO_3$ powder (purity: 99.8%), $TiO_2$ powder (purity: 99.5%), $SrCO_3$ powder (purity: 99%), $SnO_2$ powder (purity: 99%), and FeO powder (purity: 99%). Each of the resultant mixtures was heated at 1000° to 1500° C. for melting. The molten material was poured into water for rapid cooling and vitrification. The vitrified material was crushed by use of an alumina-made pot mill for reduction so as to attain a particle size of 50 μm or less, to thereby obtain glaze frit. The glaze frit was mixed with 3 parts by weight of clay mineral such as New Zealand kaolin, 2 parts by weight of PVA as an organic binder, and 100 parts by weight of water, wherein the amounts are based on 100 parts by weight of the glaze frit, to thereby obtain glaze slurry.

As shown in FIG. 10, the glaze slurry was sprayed through a spray nozzle onto the surface of the insulator 2, followed by drying, to thereby form the glaze slurry coating 2d'. After drying, the thickness of the glaze coating became about 80 μm. By use of the thus-fabricated insulators 2, various types of spark plugs 100 shown in FIG. 1 were prepared through the method described with reference to FIGS. 11A–11D, 12A, and 12B. However, the outer diameter of the thread portion 7 was made 14 mm. Also, $B_2O_3$—$SiO_2$—BaO—$Li_2O$ glass, $ZrO_2$ powder, carbon black powder, $TiO_2$ powder, and metallic Al powder were used as raw powders for the resistor 15; and $B_2O_3$—$SiO_2$—$Na_2O$ glass, Cu powder, Fe powder, and Fe—B powder were used as raw powders for the conductive glass seal layers 16 and 17. the temperature during glass sealing; i.e., the glost-firing temperature, was 900° C. The glaze layer 2d formed on the surface of each of the insulators 2 had a thickness of about 50 μm.

Separately, samples of glaze in lump form were prepared through solidification without subsequent crushing. Through X-ray diffraction, the samples of lumpy glaze were confirmed to have been vitrified (amorphous). The following experiments were performed by use of the samples.

(1) Analysis of chemical composition: Fluorescent X-ray spectrometry was performed. Tables 1 and 3 show the values (as reduced to corresponding oxides) of each samples obtained through the analysis. Also, the composition of the glaze layer 2d formed on the surface of each of the insulators 2 was determined through EPMA, which confirmed that the results were substantially in agreement with those obtained through analysis of the lumpy samples.

(2) Coefficient of thermal expansion: A piece (5 mm×5 mm×10 mm) for measurement was cut from each of the lumpy samples, and an average was calculated from measurements performed between 20° C. and 350° C. through a known method using a dilatometer. Also, a test piece of the same dimensions was cut from each of the insulators 2, and subjected to the same measurement: the coefficient was $7.3 \times 10^{-6}$/° C.

(3) Softening point: Each of the powder samples (50 mg) was subjected to differential thermal analysis by the application of heat. The measurement started from room temperature, and the temperature at the second peak in endothermal reaction was determined as the softening point.

Figure 8:
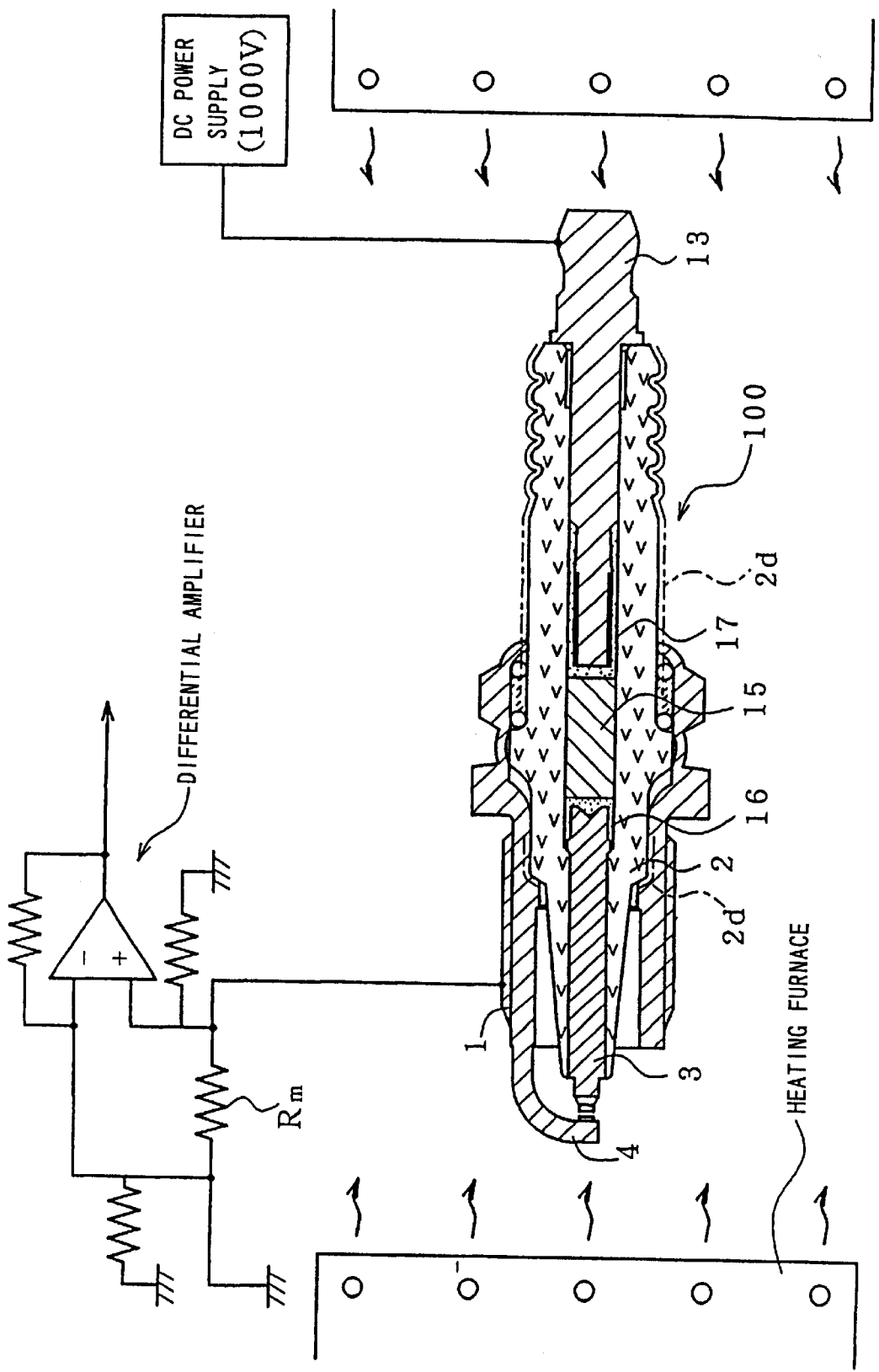
FIG. 8 is an explanatory sketch showing a method of measuring the insulation resistance of the spark plug.

The insulation resistance of each of the spark plugs was measured at 500° C. at 1000V through the method which has been already described with reference to FIG. 8. The state of the glaze layer 2d formed on each of the insulators 2 was visually checked. The results are shown in Tables 1 through 4.

TABLE 1

| | Primary components (as oxides) | | | | | | | Auxiliary component (as oxide) |
|---|---|---|---|---|---|---|---|---|
| | SiO$_2$ (wt %) | B$_2$O$_3$ (wt %) | Na$_2$O (wt %) | K$_2$O (wt %) | A$_1$/A$_2$ | BaO (wt %) | ZnO (wt %) | Total (wt %) | Al$_2$O$_3$ (wt %) |
| 1* | 16 | 44 | 4.0 | 4.0 | 1.52 | 13 | 17.5 | 98.5 | 1.5 |
| 2 | 25 | 35 | 4.0 | 4.0 | 1.52 | 13 | 17.5 | 98.5 | 1.5 |
| 3 | 30 | 30 | 4.0 | 4.0 | 1.52 | 13 | 17.5 | 98.5 | 1.5 |
| 4 | 35 | 25 | 4.0 | 4.0 | 1.52 | 13 | 17.5 | 98.5 | 1.5 |
| 5* | 40 | 20 | 4.0 | 4.0 | 1.52 | 13 | 17.5 | 98.5 | 1.5 |
| 6 | 28 | 32 | 4.0 | 4.0 | 1.52 | 13 | 17.5 | 98.5 | 1.5 |
| 7* | 28 | 32 | 4.0 | 4.0 | 1.52 | 5 | 25.5 | 98.5 | 1.5 |
| 8 | 28 | 32 | 4.0 | 4.0 | 1.52 | 8 | 22.5 | 98.5 | 1.5 |
| 9 | 28 | 32 | 4.0 | 4.0 | 1.52 | 13 | 17.5 | 98.5 | 1.5 |
| 10 | 28 | 32 | 4.0 | 4.0 | 1.52 | 18 | 12.5 | 98.5 | 1.5 |
| 11* | 28 | 32 | 4.0 | 4.0 | 1.52 | 22 | 8.5 | 98.5 | 1.5 |
| 12* | 27 | 31 | 2 | 9 | 0.34 | 12.5 | 17.0 | 98.5 | 1.5 |
| 13 | 27 | 31 | 3 | 8 | 0.57 | 12.5 | 17.0 | 98.5 | 1.5 |
| 14 | 27 | 31 | 4 | 7 | 0.87 | 12.5 | 17.0 | 98.5 | 1.5 |
| 15 | 27 | 31 | 5 | 6 | 1.27 | 12.5 | 17.0 | 98.5 | 1.5 |
| 16 | 27 | 31 | 6 | 5 | 1.82 | 12.5 | 17.0 | 98.5 | 1.5 |
| 17 | 27 | 31 | 7 | 4 | 2.66 | 12.5 | 17.0 | 98.5 | 1.5 |
| 18 | 27 | 31 | 8 | 3 | 4.05 | 12.5 | 17.0 | 98.5 | 1.5 |
| 19* | 27 | 31 | 10 | 1 | 15.2 | 12.5 | 17.0 | 98.5 | 1.5 | note) *outside the scope of the invention

TABLE 2

| | Softening point (° C.) | Coefficient of thermal expansion (× 10$^{-6}$/° C.) | Insulation resistance (MΩ) at 500° C. | Remarks |
|---|---|---|---|---|
| 1* | 600 | 9.4 | 550 | Cracks on the surface of glaze |
| 2 | 640 | 8.2 | 750 | — |
| 3 | 650 | 7.5 | 800 | — |
| 4 | 670 | 6.0 | 950 | — |
| 5* | 700 | 4.5 | 350 | Crazing in the surface of glaze |
| 6 | 650 | 8.3 | 550 | — |
| 7* | 620 | 9.0 | 150 | Cracks on the surface of glaze |
| 8 | 640 | 8.8 | 250 | — |
| 9 | 670 | 8.2 | 650 | — |
| 10 | 685 | 7.0 | 700 | — |
| 11* | 750 | 6.5 | 850 | Poor melting of glaze |
| 12* | 730 | 7.8 | 50 | Poor melting of glaze |
| 13 | 700 | 6.8 | 80 | — |
| 14 | 680 | 5.9 | 120 | — |
| 15 | 630 | 7.1 | 550 | — |
| 16 | 640 | 6.5 | 600 | — |
| 17 | 630 | 7.8 | 80 | — |
| 18 | 630 | 7.4 | 45 | — |
| 19* | 610 | 8.0 | 25 | — |

*outside the scope of the invention

TABLE 3

| | Primary components (as oxides) | | | | | | | Auxiliary components (as oxides) | |
|---|---|---|---|---|---|---|---|---|---|
| | SiO$_2$ (wt %) | B$_2$O$_3$ (wt %) | Alkali (1) component/wt % | Alkali (2) component/wt % | BaO (wt %) | ZnO (wt %) | Total (wt %) | (1) Component/wt % | (2) Component/wt % |
| 101 | 15 | 38 | Na$_2$O 3.0 | K$_2$O 4.2 | 17.8 | 20.0 | 98.0 | Al$_2$O$_3$ 1.9 | Fe$_2$O$_3$ 0.1 |
| 102 | 20 | 35 | Na$_2$O 6.1 | K$_2$O 3.5 | 19.9 | 15.4 | 99.9 | Al$_2$O$_3$ 0.1 | — |
| 103 | 25 | 31 | Na$_2$O 4.5 | K$_2$O 6.2 | 10.9 | 20.3 | 97.9 | Al$_2$O$_3$ 1.6 | CaO 0.5 |
| 104* | 35 | 39 | Na$_2$O 6.0 | K$_2$O 3.5 | 8.2 | 6.5 | 98.2 | Al$_2$O$_3$ 1.2 | FeO 0.6 |
| 105* | 45 | 35 | Na$_2$O 6.2 | K$_2$O 3.8 | 4.2 | 4.9 | 99.1 | CaO 0.9 | — |
| 106* | 51 | 31 | Na$_2$O 6.6 | K$_2$O 3.1 | 3.6 | 3.7 | 99.0 | CaO 1.0 | — |
| 107* | 26 | 14 | Na$_2$O 5.7 | K$_2$O 6.8 | 27.5 | 17.9 | 97.9 | Al$_2$O$_3$ 1.7 | CaO 0.4 |

TABLE 3-continued

| | Primary components (as oxides) | | | | | | | Auxiliary components (as oxides) | |
|---|---|---|---|---|---|---|---|---|---|
| | SiO$_2$ (wt %) | B$_2$O$_3$ (wt %) | Alkali (1) component/wt % | Alkali (2) component/wt % | BaO (wt %) | ZnO (wt %) | Total (wt %) | (1) Component/wt % | (2) Component/wt % |
| 108* | 21 | 25 | Na$_2$O 4.9 | K$_2$O 5.1 | 21.0 | 18.0 | 95.0 | Al$_2$O$_3$ 3.7 | TiO$_2$ 1.3 |
| 109 | 32 | 28 | Na$_2$O 5.2 | K$_2$O 6.7 | 12.1 | 12.5 | 96.5 | Al$_2$O$_3$ 1.9 | SrO 1.6 |
| 110 | 27 | 31 | Na$_2$O 4.1 | K$_2$O 4.2 | 12.5 | 19.7 | 98.5 | SrO 1.5 | — |
| 111* | 30 | 35 | Na$_2$O 4.8 | K$_2$O 5.5 | 14.7 | 9.8 | 99.8 | SrO 0.2 | — |
| 112* | 35 | 42 | Na$_2$O 6.3 | K$_2$O 4.0 | 2.7 | 9.7 | 99.7 | Al$_2$O$_3$ 0.3 | — |
| 113* | 25 | 31 | Na$_2$O 2.2 | K$_2$O 2.1 | 18.0 | 19.5 | 97.8 | TiO$_2$ 2.2 | — |
| 114 | 28 | 35 | Na$_2$O 3.0 | K$_2$O 4.6 | 13.5 | 14.4 | 98.5 | Al$_2$O$_3$ 1.0 | SnO$_2$ 0.5 |
| 115 | 29 | 33 | Na$_2$O 4.3 | K$_2$O 5.7 | 14.2 | 12.0 | 98.2 | Al$_2$O$_3$ 1.5 | FeO 0.3 |
| 116 | 28 | 35 | K$_2$O 6.7 | Li$_2$O 4.1 | 12.7 | 12.1 | 98.6 | Al$_2$O$_3$ 1.2 | CaO 0.2 |
| 117 | 27 | 32 | Na$_2$O 8.0 | K$_2$O 5.1 | 15.4 | 12.3 | 99.8 | Al$_2$O$_3$ 0.1 | CaO 0.1 |
| 118* | 26 | 30 | Na$_2$O 9.5 | K$_2$O 6.1 | 12.5 | 13.5 | 97.6 | Al$_2$O$_3$ 0.8 | CaO 1.6 |
| 119* | 29 | 31 | K$_2$O 5.3 | Li$_2$O 1.7 | 18.2 | 13.0 | 98.2 | Al$_2$O$_3$ 1.5 | FeO 0.3 |
| 120* | 28 | 29 | Na$_2$O 10.3 | K$_2$O 10.0 | 8.1 | 12.4 | 97.8 | Al$_2$O$_3$ 0.9 | CaO 1.3 | note) *outside the scope of the invention

TABLE 4

| | Softening point (° C.) | Coefficient of thermal expansion (× 10$^{-6}$/° C.) | Insulation resistance (MΩ) at 500° C. | Remarks |
|---|---|---|---|---|
| 101 | 710 | 8.7 | 550 | Cracks on the surface of glaze |
| 102 | 650 | 8.5 | 320 | |
| 103 | 695 | 7.8 | 400 | |
| 104* | 700 | 5.0 | 550 | |
| 105* | 770 | 4.8 | 250 | Poor melting of glaze, and cracks |
| 106* | 750 | 5.6 | 200 | Poor melting of glaze |
| 107* | 810 | 7.9 | 450 | Poor melting of glaze |
| 108* | 660 | 7.6 | 700 | |
| 109 | 690 | 7.2 | 650 | |
| 110 | 640 | 7.3 | 800 | |
| 111* | 650 | 6.8 | 900 | |
| 112* | 630 | 6.1 | 150 | Phase splitting of glaze surface (striae) |
| 113* | 820 | 7.5 | 950 | Poor melting of glaze |
| 114 | 625 | 7.1 | 800 | |
| 115 | 695 | 6.9 | 700 | |
| 116 | 625 | 7.3 | 550 | |
| 117 | 600 | 7.1 | 150 | |
| 118* | 610 | 8.7 | 80 | Cracks on the surface of glaze |
| 119* | 675 | 7.5 | 50 | |
| 120* | 590 | 9.1 | 25 | Cracks on the surface of glaze |

*outside the scope of the invention

Therefore, in the spark plug having a glaze layer which satisfies the requirements of the first mode of the present invention, no cracks or other defects were generated on the glaze layer, indicating that an excellent glaze layer was obtained even at a low glost-firing temperature of 800° to 950° C. Although the amounts of alkali metal components were high, the insulation resistance was as high as 200 MΩ at 500° C., indicating excellent flashover prevention.

Experiment 2

Insulators 2 of the same shape and material as in Experiment 2 were fabricated. Glaze slurry was prepared as follows. The raw materials used were SiO$_2$ powder (purity: 99.5%), H$_3$BO$_3$ powder (purity: 98.5%), ZnO powder (purity: 99.5%), BaCO$_3$ powder (purity: 99.5%), Na$_2$CO$_3$ powder (purity: 99.5%), K$_2$CO$_3$ powder (purity: 99%), Li$_2$CO$_3$ powder (purity: 99%), Al$_2$O$_3$ powder (purity: 99.5%), CaCO$_3$ powder (purity: 99.8%), TiO$_2$ powder (purity: 99.5%), and ZrO$_2$ powder (purity: 98%). These were mixed at various mixing proportions. The resultant mixture was heated at 1000° to 1500° C. for melting. The molten material was poured into water for rapid cooling and vitrification. The vitrificated material was crushed by use of an alumina-made pot mill into grains having a average particle size of 9 to 10 μm, to thereby obtain glaze frit. To the glaze frit were added kaolin in an amount of 10% by weight serving as a clay mineral (England kaolin), an acrylic organic binder in an amount of 1% by weight, and water in an amount of 35% by weight, with the remainder being the glaze frit, followed by mixing, to thereby obtain glaze slurry.

Each of the thus-obtained glaze slurries was allowed to stand for 10 days in a constant temperature bath at 40° C. in order to stabilize the elution of B component and alkali metal components from the glaze frit, followed by measurement by use of a Model B viscosimeter (Model: B, product of Tokyo Keiki K.K., Type No.: BH).

A variety of spark plugs 100 shown in FIG. 1 were manufactured under the same conditions as in Experiment 1, except that the above-described glaze slurries were used (1000 pieces were manufactured for each glaze slurry composition). The glaze layer 2d formed on each of the insulators 2 had a thickness of about 50 μm. As in Experiment 1, the thus-obtained spark plugs were measured for their insulation resistance at 500° C. The state of the glaze layer 2d formed on each of the insulators 2 was visually checked.

Separately, samples of lumpy glaze were prepared through solidification without subsequent crushing. The lumpy samples were confirmed to have been vitrified (amorphous) through X-ray diffraction. The following experiments were performed by use of the samples.

(1) Analysis of chemical composition: X-ray fluorescence analysis was employed. Table 5 shows the values (as reduced to the respective oxides) for each sample obtained through the analysis. Also, the composition of the glaze layer 2d formed on the surface of each of the insulators 2 was determined through EPMA, and the obtained values were confirmed to be substantially identical to the values obtained through analysis of the lump samples.

(2) Softening point: Each powdery sample (50 mg) was subjected to differential thermal analysis under heat. The measurement was performed from room temperature, and the temperature at the second peak in endothermal reaction was determined as the softening point. The results are shown in Table 6.

(3) The glaze layer obtained through glost-firing was visually checked for cracks or crazing, and the number of spark plugs having an affected glaze layer per 1000 was counted. The results are shown in Table 6.

layer were excellent, and the incidence of cracking or crazing was low. Especially, an excellent glaze layer were obtained even at a low glost-firing temperature of 800° to 950° C. The insulation resistance was as high as 200 MΩ or more at 500° C., indicating excellent flashover prevention. Also, the glaze slurry used for forming a glaze layer had a relatively low viscosity, which contributed to formation of a homogeneous glaze layer having fewer defects.

TABLE 5

| No. | Chemical composition (wt %) | | | | | | | | | $ZrO_2$ + $TiO_2$ (wt %) | $W_{Ti}/W_{Zr}$ | $Li_2O$ + $K_2O$ + $Na_2O$ (wt %) |
|---|---|---|---|---|---|---|---|---|---|---|---|---|
| | $SiO_2$ | $B_2O_3$ | ZnO | BaO | $Li_2O$ | $K_2O$ | $Na_2O$ | $TiO_2$ | $ZrO_2$ | | | |
| 1 | 26.5 | 21.6 | 21.4 | 12.7 | 0.9 | 4.5 | 4.3 | 5.7 | 2.4 | 8.1 | 2.4 | 9.7 |
| 2 | 24.7 | 24.1 | 17.4 | 17.4 | 0.5 | 4.8 | 5.3 | 3.7 | 2.1 | 5.8 | 1.8 | 10.6 |
| 3 | 28.8 | 27.7 | 16.2 | 12.8 | 0.1 | 3.7 | 3.5 | 3.4 | 3.8 | 7.2 | 0.9 | 7.3 |
| 4 | 31.9 | 25.4 | 18.1 | 13.2 | 1.5 | 3.3 | 2.8 | 2.1 | 1.7 | 3.8 | 1.2 | 7.6 |
| 5 | 33.7 | 21.9 | 16.4 | 13.8 | 0.1 | 2.4 | 3.1 | 4.7 | 3.9 | 8.6 | 1.2 | 5.6 |
| 6 | 35.0 | 29.0 | 17.8 | 12.2 | 0.1 | 0.5 | 0.7 | 3.8 | 0.9 | 4.7 | 4.2 | 1.3 |
| 7 | 37.8 | 26.9 | 16.8 | 12.2 | 0.4 | 0.5 | 0.7 | 3.8 | 0.9 | 4.7 | 4.2 | 1.6 |
| 8 | 38.4 | 21.5 | 15.8 | 16.5 | 0.1 | 0.1 | 0.7 | 4.2 | 2.7 | 6.9 | 1.6 | 0.9 |
| 9 | 23.1 | 22.1 | 24.7 | 16.1 | 0.8 | 0.0 | 4.5 | 8.7 | 0.0 | 8.7 | — | 5.3 |
| 10 | 22.1 | 21.6 | 24.7 | 17.6 | 0.8 | 0.0 | 4.5 | 8.2 | 0.5 | 8.7 | 16.4 | 5.3 |
| 11 | 25.3 | 23.6 | 16.8 | 22.7 | 0.0 | 4.2 | 4.8 | 0.2 | 2.4 | 2.6 | 0.1 | 9.0 |
| 12 | 27.4 | 23.5 | 19.7 | 15.4 | 0.0 | 5.1 | 4.1 | 2.7 | 2.1 | 4.8 | 1.3 | 9.2 |
| 13* | 42.3* | 21.5 | 16.9 | 13.2 | 0.5 | 0.7 | 1.4 | 1.4 | 2.1 | 3.5 | 0.7 | 2.6 |
| 14* | 17.4* | 38.1* | 16.2 | 12.7 | 2.1 | 2.0 | 2.4 | 6.9 | 2.2 | 9.1 | 3.1 | 6.5 |
| 15* | 23.9 | 21.0 | 17.2 | 17.8 | 3.7 | 4.9 | 5.9 | 3.4 | 2.2 | 5.6 | 1.5 | 14.5 |
| 16* | 25.3 | 27.4 | 17.9 | 12.9 | 1.8 | 1.2 | 1.8 | 5.4 | 6.3 | 11.7* | 0.9 | 4.8 |
| 17* | 32.4 | 17.1* | 19.2 | 15.6 | 1.3 | 2.5 | 2.6 | 2.8 | 6.5 | 9.3 | 0.4 | 6.4 |
| 18* | 26.7 | 26.2 | 13.0* | 15.9 | 0.7 | 3.2 | 4.3 | 6.5 | 3.5 | 10.0 | 1.9 | 8.2 |
| 19* | 21.7 | 29.0 | 23.8 | 8.0* | 0.6 | 4.5 | 4.1 | 7.2 | 1.1 | 8.3 | 6.5 | 9.2 |
| 20* | 19.7 | 25.2 | 17.9 | 25.0* | 0.2 | 2.8 | 2.5 | 3.8 | 2.9 | 6.7 | 1.3 | 5.5 |
| 21* | 29.8 | 25.1 | 18.9 | 18.7 | 0.1 | 3.8 | 2.6 | 0.5 | 0.5 | 1.0* | 1.0 | 6.5 | note) *outside the scope of the invention

TABLE 6

| No. | Softening point (° C.) | Viscosity of slurry mPa · S | Insulation resistance MΩ | Condition of molten glass | Incidence of cracking (per 1000 pieces) | Incidence of crazing (per 1000 pieces) |
|---|---|---|---|---|---|---|
| 1 | 640 | 420 | 600 | Good | 0 | 0 |
| 2 | 625 | 720 | 400 | Good | 0 | 0 |
| 3 | 615 | 270 | 700 | Moderate | 0 | 0 |
| 4 | 635 | 360 | 1000 | Good | 0 | 0 |
| 5 | 670 | 150 | 1200 | Moderate | 0 | 0 |
| 6 | 695 | 110 | 3500 | Good | 0 | 0 |
| 7 | 650 | 290 | 2100 | Good | 0 | 0 |
| 8 | 675 | 480 | 1500 | Good | 0 | 0 |
| 9 | 620 | 120 | 700 | Good | 0 | 2 |
| 10 | 620 | 180 | 1800 | Good | 0 | 0 |
| 11 | 615 | 720 | 800 | Moderate | 0 | 0 |
| 12 | 660 | 680 | 600 | Good | 0 | 0 |
| 13* | 745 | 420 | 800 | Bad | 0 | 13 |
| 14* | 590 | 580 | 600 | Bad | 34 | 0 |
| 15* | 590 | 2500 | 150 | Good | 0 | 0 |
| 16* | 590 | 300 | 800 | Bad | 0 | 0 |
| 17* | 730 | 200 | 1200 | Bad | 0 | 0 |
| 18* | 750 | 650 | 750 | Bad | 0 | 0 |
| 19* | 670 | 710 | 180 | Good | 0 | 0 |
| 20* | 725 | 380 | 1800 | Good | 0 | 0 |
| 21* | 740 | 410 | 1500 | Bad | 0 | 0 |

*outside the scope of the invention

As is apparent from the above, in the spark plug having a glaze layer which satisfies the requirements of the second mode of the present invention, conditions of a molten glaze Obviously, numerous modifications and variations of the present invention are possible in light of the above teachings. It is therefore to be understood that within the scope of the appended claims, the present invention may be practiced otherwise than as specifically described herein.

What is claimed is:

1. A spark plug comprising:

a center electrode;

a metallic shell disposed so as to surround the center electrode;

a ground electrode, one end of the ground electrode being connected to the metallic shell, while the other end of the ground electrode facing the center electrode;

an insulator disposed between the center electrode and the metallic shell such that the insulator covers the outer surface of the center electrode; and a glaze layer mainly formed of oxides and adapted to cover at least a portion of the surface of the insulator, wherein glaze which forms the glaze layer predominantly comprises Si, B, Zn, and Ba, and two co-added alkali metal components selected from among Na, K, and Li, wherein the amount of Si is 18 to 35% by weight as reduced to $SiO_2$, the amount of B is 25 to 40% by weight as reduced to $B_2O_3$, the amount of Zn is 10 to 25% by weight as reduced to ZnO, the amount of Ba is 7 to 20% by weight as reduced to BaO, and the amount of each of the two co-added alkali metal components is 3 to 9% by weight as reduced to $Na_2O$, $K_2O$, or $Li_2O$.

2. A spark plug according to claim 1, wherein the glaze contains Si in an amount of 25 to 30% by weight as reduced to $SiO_2$, B in an amount of 30 to 35% by weight as reduced to $B_2O_3$, Zn in an amount of 12 to 18% by weight as reduced to ZnO, Ba in an amount of 8 to 15% by weight as reduced to BaO, Na in an amount of 3 to 9% by weight as reduced to $Na_2O$, and K in an amount of 3 to 9% by weight as reduced to $K_2O$.

3. A spark plug according to claim 1, wherein the glaze contains, as auxiliary cationic components, one or more elements selected from among Al, Ca, Fe, Zr, Ti, Sr, Mg, Bi, Ni, Sn, P, and Mn, the total amount of the auxiliary cationic components being 5% by weight or less with respect to the entirety of the glaze composition, wherein Al is calculated as reduced to $Al_2O_3$, Ca is calculated as reduced to CaO, Fe is calculated as reduced to $Fe_2O_3$, Zr is calculated as reduced to $ZrO_2$, Ti is calculated as reduced to $TiO_2$, Sr is calculated as reduced to SrO, Mg is calculated as reduced to MgO, Bi is calculated as reduced to $Bi_2O_3$, Ni is calculated as reduced to NiO, Sn is calculated as reduced to $SnO_2$, P is calculated as reduced to $P_2O_5$, and Mn is calculated as reduced to MnO.

4. A spark plug according to claim 1, wherein the glaze contains substantially no Pb or contains Pb in an amount of 1.0% by weight or less as reduced to PbO.

5. A spark plug according to claim 1, wherein the total amount of the co-added alkali metal components contained in the glaze is 8 to 20% by weight as reduced to their oxides.

6. A spark plug according to claim 1, wherein when A1 represents the amount by mole of one of the two co-added alkali metal components and A2 represents that of the other, provided that Na is calculated as reduced to $Na_2O$, K is calculated as reduced to $K_2O$, and Li is calculated as reduced to $Li_2O$, the value of A1/A2 is regulated within the range of 1.0 to 2.0.

7. A spark plug according to claim 1, wherein the total amount of cationic components contained in the glaze; i.e., Si, B, Zn, Ba, and co-added alkali metal components is at least 95% by weight as reduced to their oxides.

8. A spark plug according to claim 1, wherein the spark plug comprises a rod-shaped terminal metal piece portion disposed within a through-hole of the insulator such that the terminal metal price portion is integrated with the center electrode, or is separated from the center electrode with a conductive bonding layer disposed therebetween; and the insulator has an insulating resistance of 200 MΩ or greater when measured in a state in which the entirety of the spark plug is maintained at about 500° C., and an electric current is caused to flow between the terminal metal piece portion and the metallic shell.

9. A spark plug according to claim 1, wherein the insulator is formed from an alumina-based insulating material containing Al in an amount of 85 to 98% by weight as reduced to $Al_2O_3$; and the glaze has an average coefficient of linear expansion of $5.0 \times 10^{-6}/°$ C. to $8.5 \times 10^{-6}/°$ C. as measured within the temperature range from 20° C. to 350° C.

10. A spark plug according to claim 1, wherein the softening point of the glaze is 600° to 700° C.

11. A spark plug comprising:
a center electrode;
a metallic shell disposed to surround the center electrode;
a ground electrode having ends, one end of the ground electrode being connected to the metallic shell, the other end of the ground electrode facing the center electrode;
an insulator disposed between the center electrode and the metallic shell, the insulator covering an outer surface of the center electrode; and
a glaze layer formed to cover at least a portion of a surface of the insulator, wherein
glaze which forms the glaze layer predominantly comprises Si, B, Zn, and Ba, as well as at least one component selected from Ti and Zr, wherein the amount of Si is 20 to 38% by weight as reduced to $SiO_2$, the amount of B is 20 to 35% by weight as reduced to $B_2O_3$, the amount of Zn is 15 to 25% by weight as reduced to ZnO, the amount of Ba is 10 to 23% by weight as reduced to BaO, and the amount of Ti and Zr is 2 to 10% by weight as reduced to $TiO_2$ or $ZrO_2$; and the glaze further comprises at least one alkali component selected from among Na, K, and Li in a total amount of 12% by weight or less as reduced to their oxides, wherein the Pb content is not greater than 0.1% by weight as reduced to PbO.

12. A spark plug according to claim 11, wherein the total content of a component selected from Ti and Zr and the alkali metal component is not less than 8% by weight.

13. A spark plug according to claim 11, wherein the spark plug includes a rod-shaped terminal metal piece portion disposed within a through-hole of the insulator such that the terminal metal piece portion is integrated with the center electrode or is separated from the center electrode with a conductive bonding layer disposed therebetween; and the insulator has an insulating resistance of 200 MΩ or greater when measured in a state in which the entirety of the spark plug is maintained at about 500° C., and an electric current is caused to flow between the terminal metal piece portion and the metallic shell.

14. A spark plug according to claim 11, wherein the insulator is formed from an alumina-based insulating material containing Al in an amount of 85 to 98% by weight as reduced to $Al_2O_3$; and the glaze has an average coefficient of linear expansion of $5.0 \times 10^{-6}/°$ C. to $8.5 \times 10^{-6}/°$ C. as measured within the temperature range from 20° C. to 350° C.

15. A spark plug according to claim 11, wherein the softening point of the glaze is 600° to 700° C.

16. A spark plug comprising:
a center electrode;
a metallic shell disposed to surround the center electrode;
a ground electrode having ends, one end of the ground electrode being connected to the metallic shell, the other end of the ground electrode facing the center electrode;
an insulator disposed between the center electrode and the metallic shell, the insulator covering an outer surface of the center electrode; and
a glaze layer formed to cover at least a portion of a surface of the insulator, wherein
glaze which forms the glaze layer predominantly comprises Si, B, Zn, and Ba, as well as at least one component selected from Ti and Zr, wherein the amount of Si is 20 to 40% by weight as reduced to $SiO_2$, the amount of B is 20 to 35% by weight as reduced to $B_2O_3$, the amount of Zn is 15 to 25% by weight as reduced to ZnO, the amount of Ba is 10 to 23% by weight as reduced to BaO, and the amount of Ti and Zr is 2 to 10% by weight as reduced to $TiO_2$ or $ZrO_2$, where the Zr content as reduced to $ZrO_2$ is not greater than 3.4% by weight; and the glaze further comprises at least one alkali component selected from among Na, K, and Li in a total amount of 12% by weight or less as reduced to their oxides, wherein the Pb content is not greater than 0.1% by weight as reduced to PbO.

17. A spark plug according to claim 16, wherein the total content of a component selected from Ti and Zr and the alkali metal component is not less than 8% by weight.

18. A spark plug according to claim 16, wherein the spark plug comprises a rod-shaped terminal metal piece portion disposed within a through-hole of the insulator such that the terminal metal price portion is integrated with the center electrode, or is separated from the center electrode with a conductive bonding layer disposed therebetween; and the insulator has an insulating resistance of 200 MΩ or greater when measured in a state in which the entirety of the spark plug is maintained at about 500° C., and an electric current is caused to flow between the terminal metal piece portion and the metallic shell.

19. A spark plug according to claim 16, wherein the insulator is formed from an alumina-based insulating material containing Al in an amount of 85 to 98% by weight as reduced to $Al_2O_3$; and the glaze has an average coefficient of linear expansion of $5.0 \times 10^{-6}$/° C. to $8.5 \times 10^{-6}$/° C. as measured within the temperature range from 20° C. to 350° C.

20. A spark plug according to claim 16, wherein the softening point of the glaze is 600° to 700° C.

21. A spark plug comprising:

a center electrode;

a metallic shell disposed to surround the center electrode;

a ground electrode having ends, one end of the ground electrode being connected to the metallic shell, the other end of the ground electrode facing the center electrode;

an insulator disposed between the center electrode and the metallic shell, the insulator covering an outer surface of the center electrode; and a glaze layer formed so as to cover at least a portion of a surface of the insulator, wherein glaze which forms the glaze layer predominantly comprises Si, B, Zn, and Ba, as well as at least one component selected from Ti and Zr, wherein the amount of Si is 20 to 40% by weight as reduced to $SiO_2$, the amount of B is 20 to 35% by weight as reduced to $B_2O_3$, the amount of Zn is 15 to 25% by weight as reduced to ZnO, the amount of Ba is 10 to 23% by weight as reduced to BaO, and the amount of Ti and Zr is 2 to 10% by weight as reduced to $TiO_2$ or $ZrO_2$, where the Ti content as reduced to $TiO_2$ is not greater than 1.5% by weight; and the glaze further comprises at least one alkali component selected from among Na, K, and Li in a total amount of 12% by weight or less as reduced to their oxides, wherein the Pb content is not greater than 0.1% by weight as reduced to PbO.

22. A spark plug according to claim 21, wherein the total content of a component selected from Ti and Zr and the alkali metal component is not less than 8% by weight.

23. A spark plug according to claim 21, wherein the spark plug comprises a rod-shaped terminal metal piece portion disposed within a through-hole of the insulator such that the terminal metal piece portion is integrated with the center electrode, or is separated from the center electrode with a conductive bonding layer disposed therebetween; and the insulator has an insulating resistance of 200 MΩ or greater when measured in a state in which the entirety of the spark plug is maintained at about 500° C., and an electric current is caused to flow between the terminal metal piece portion and the metallic shell.

24. A spark plug according to claim 21, wherein the insulator is formed from an alumina-based insulating material containing Al in an amount of 85 to 98% by weight as reduced to $Al_2O_3$; and the glaze has an average coefficient of linear expansion of $5.0 \times 10^{-6}$/° C. to $8.5 \times 10^{-6}$/° C. as measured within the temperature range from 20° C. to 350° C.

25. A spark plug according to claim 21, wherein the softening point of the glaze is 600° to 700° C.

26. A spark plug comprising:

a center electrode;

a metallic shell disposed to surround the center electrode;

a ground electrode having ends, one end of the ground electrode being connected to the metallic shell, the other end of the ground electrode facing the center electrode;

an insulator disposed between the center electrode and the metallic shell, the insulator covering an outer surface of the center electrode; and a glaze layer formed to cover at least a portion of a surface of the insulator, wherein glaze which forms the glaze layer predominantly comprises Si, B, Zn, and Ba, as well as at least one component selected from Ti and Zr, wherein the amount of Si is 20 to 40% by weight as reduced to $SiO_2$, the amount of B is 20 to 35% by weight as reduced to $B_2O_3$, the amount of Zn is 15 to 25% by weight as reduced to ZnO, the amount of Ba is 10 to 23% by weight as reduced to BaO, and the total amount of Ti and Zr is 2 to 10% by weight as reduced to $TiO_2$ or $ZrO_2$, where the ratio between the Ti content WTi as reduced to $TiO_2$ and the Zr content WZr as reduced to $ZrO_2$, i.e., WTi/WZr is 0.2 to 10; and the glaze further comprises at least one alkali component selected from among Na, K, and Li in a total amount of 12% by weight or less as reduced to their oxides, wherein the Pb content is not greater than 0.1% by weight as reduced to PbO.

27. A spark plug according to claim 26, wherein the total content of a component selected from Ti and Zr and the alkali metal component is not less than 8% by weight.

28. A spark plug according to claim 26, wherein the spark plug comprises a rod-shaped terminal metal piece portion disposed within a through-hole of the insulator such that the terminal metal price portion is integrated with the center electrode, or is separated from the center electrode with a conductive bonding layer disposed therebetween; and the insulator has an insulating resistance of 200 MΩ or greater when measured in a state in which the entirety of the spark plug is maintained at about 500° C., and an electric current is caused to flow between the terminal metal piece portion and the metallic shell.

29. A spark plug according to claim 26, wherein the insulator is formed from an alumina-based insulating material containing Al in an amount of 85 to 98% by weight as reduced to $Al_2O_3$; and the glaze has an average coefficient of linear expansion of $5.0 \times 10^{-6}$/° C. to $8.5 \times 10^{-6}$/° C. as measured within the temperature range from 20° C. to 350° C.

30. A spark plug according to claim 26, wherein the softening point of the glaze is 600° to 700° C.

* * * * *